(12) United States Patent
Wang

(10) Patent No.: US 12,513,680 B2
(45) Date of Patent: Dec. 30, 2025

(54) SEMI-PERSISTENT SCHEDULING METHOD FOR MULTICAST/BROADCAST SERVICE, APPARATUS AND STORAGE MEDIUM

(71) Applicant: DATANG MOBILE COMMUNICATIONS EQUIPMENT CO., LTD., Beijing (CN)

(72) Inventor: Junwei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 362 days.

(21) Appl. No.: 18/028,510

(22) PCT Filed: Sep. 23, 2021

(86) PCT No.: PCT/CN2021/119998
§ 371 (c)(1),
(2) Date: Mar. 24, 2023

(87) PCT Pub. No.: WO2022/063192
PCT Pub. Date: Mar. 31, 2022

(65) Prior Publication Data
US 2024/0032012 A1    Jan. 25, 2024

(30) Foreign Application Priority Data
Sep. 28, 2020 (CN) .......................... 202011043548.6

(51) Int. Cl.
*H04W 72/11* (2023.01)
*H04W 72/30* (2023.01)

(52) U.S. Cl.
CPC ............ *H04W 72/11* (2023.01); *H04W 72/30* (2023.01)

(58) Field of Classification Search
CPC ..... H04W 72/11; H04W 72/30; H04W 72/23; H04W 4/06
See application file for complete search history.

(56) References Cited

U.S. PATENT DOCUMENTS

| 2013/0301582 A1 | 11/2013 | Jiang et al. |
| 2013/0315124 A1 | 11/2013 | Rapaport et al. |

(Continued)

FOREIGN PATENT DOCUMENTS

| CN | 102546195 A | 7/2012 |
| CN | 102573096 A | 7/2012 |

(Continued)

OTHER PUBLICATIONS

State Intellectual Property Office of the People's Republic of China, Notice of Allowance Issued in Application No. 202011043548.6, Apr. 28, 2023, 19 pages.

(Continued)

*Primary Examiner* — Diane D Mizrahi
(74) *Attorney, Agent, or Firm* — KILPATRICK TOWNSEND & STOCKTON LLP

(57) ABSTRACT

The present application provides a semi-persistent scheduling method for a multicast/broadcast service, an apparatus and a storage medium. A network device configures semi-persistent configuration information for terminal devices in advance, and the semi-persistent configuration information includes a first identifier for scrambling activation information and related information of a PDSCH for sending a multicast/broadcast service. Every time multicast/broadcast service data transmission is required, the network device sends the activation information to terminal devices according to the first identifier to indicate activating the semi-persistent configuration information, and then sends the PDSCH to the terminal devices by multicast/broadcast according to the semi-persistent configuration information, (Continued)

to realize that multicast/broadcast service data is transmitted from the network device to N terminal devices by multicast/broadcast.

20 Claims, 4 Drawing Sheets

(56) References Cited

U.S. PATENT DOCUMENTS

| | | | |
|---|---|---|---|
| 2014/0286221 A1 | 9/2014 | Chandramouli et al. | |
| 2018/0026803 A1 | 1/2018 | Fujishiro et al. | |
| 2018/0042033 A1 | 2/2018 | Xu et al. | |
| 2018/0049060 A1 | 2/2018 | Fujishiro et al. | |
| 2022/0304041 A1* | 9/2022 | Fu | H04W 72/23 |
| 2023/0217442 A1* | 7/2023 | Jang | H04W 72/20 |
| 2024/0334475 A1* | 10/2024 | Malkamäki | H04W 4/06 |

FOREIGN PATENT DOCUMENTS

| | | | |
|---|---|---|---|
| CN | 103166737 A | 6/2013 | |
| CN | 104519466 A | 4/2015 | |
| CN | 104871448 A | 8/2015 | |
| CN | 105992158 A | 10/2016 | |
| CN | 106470496 A | 3/2017 | |
| CN | 107251588 A | 10/2017 | |
| CN | 107852716 A | 3/2018 | |
| CN | 108605338 A | 9/2018 | |
| CN | 108781345 A | 11/2018 | |
| CN | 109155904 A | 1/2019 | |
| CN | 109802763 A | 5/2019 | |
| CN | 110199555 A | 9/2019 | |
| CN | 110830151 A | 2/2020 | |
| CN | 111263317 A | 6/2020 | |
| CN | 111587553 A | 8/2020 | |
| EP | 3258713 A1 | 12/2017 | |
| WO | 2018058637 A1 | 4/2018 | |

OTHER PUBLICATIONS

Nokia et al.,"DCI formats and SPS support for SC-PTM", 3GPP TSG RAN WG1 Meeting #87, Reno, USA, Nov. 14-18, 2016, total 3 pages, R1-1611310.

European Patent Office, Extended European Search Report Issued in Application No. 21871561.3, Sep. 18, 2024, Germany, 8 pages.

* cited by examiner

SEMI-PERSISTENT SCHEDULING METHOD FOR MULTICAST/BROADCAST SERVICE, APPARATUS AND STORAGE MEDIUM

CROSS-REFERENCES TO RELATED APPLICATIONS

The present application is a National Stage of International Application No. PCT/CN2021/119998, filed on Sep. 23, 2021, which claims priority to Chinese patent application No. 202011043548.6, filed to China National Intellectual Property Administration on Sep. 28, 2020 and entitled "SEMI-PERSISTENT SCHEDULING METHOD FOR MULTICAST/BROADCAST SERVICE, APPARATUS AND STORAGE MEDIUM". The content of the above applications are hereby incorporated by reference in their entireties.

TECHNICAL FIELD

The present application relates to the field of communication technologies and, in particular, to a semi-persistent scheduling method for multicast/broadcast services, an apparatus and a storage medium.

BACKGROUND

In technical evolution of new radio (NR), multicast and broadcast services (MBS) are involved. MBS data is targeted to a group of user equipments (UEs), and data transmission is carried out at a lower data rate, which is conducive to saving air interface resources. There are a wide range of service types of MBS, which includes a streaming media type of services, such as Internet protocol television (IPTV) multicast with Internet protocol version 4 (IPv4)/IPv6; and which, in addition, also includes data services, such as public safety alarm, software update, vehicle to X (V2X) application, group communication, etc.

A transmission process of MBS includes: for each UE in a group of UEs, a base station sends downlink control information (DCI) about the UE separately, and the DCI indicates a physical downlink shared channel (PDSCH) resource and a corresponding physical uplink control channel (PUCCH) resource of MBS, where different DCI indicates the same PDSCH resource, and different DCI indicates different PUCCH resources. The base station sends MBS data by multicast/broadcast in the same PDSCH resource. Correspondingly, different UEs receive the MBS data in the same PDSCH resource, and feed hybrid automatic repeat request (HARQ) acknowledge (ACK) back to the base station in different PUCCH resources respectively.

Since the base station needs to send the above-mentioned different DCI to multiple UEs respectively each time when scheduling the same PDSCH of MBS, a waste of air interface resources is resulted in.

SUMMARY

The present application provides a semi-persistent scheduling method for a multicast/broadcast service, an apparatus and a storage medium, which are used for saving air interface resources when scheduling the multicast/broadcast service.

In one embodiment of the present application provides a semi-persistent scheduling method for a multicast/broadcast service, and the method includes:

receiving, by a terminal device, semi-persistent configuration information for a multicast/broadcast service from a network device, where the semi-persistent configuration information includes a first identifier and related information of a PDSCH for multicast/broadcast service transmission;

receiving, by the terminal device, activation information from the network device according to the first identifier, where the activation information is used to indicate activating the semi-persistent configuration information, and the first identifier is a first-type identifier or a second-type identifier, where the first-type identifier is used to identify a terminal device, and the second-type identifier is used to identify a terminal device group of a multicast/broadcast service which a terminal device belongs to;

receiving, by the terminal device, the PDSCH from the network device according to the activation information and the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier, the third-type identifier defaults to 0 or other default values.

In one embodiment, before receiving, by the terminal device, the PDSCH from the network device, the method further includes:

activating, by the terminal device, the semi-persistent configuration information according to the activation information.

In one embodiment, after receiving, by the terminal device, the PDSCH from the network device according to the activation information and the semi-persistent configuration information, the method further includes:

sending, by the terminal device, first reception confirmation information to the network device, where the first reception confirmation information is used to indicate whether the PDSCH is received successfully.

In one embodiment, the first identifier is the first-type identifier, and the activation information includes PUCCH resource indication information and timing information;

sending, by the terminal device, the first reception confirmation information to the network device includes:

determining, by the terminal device, PUCCH resource information of the first reception confirmation information according to the PUCCH resource indication information of the activation information;

determining, by the terminal device, timing information of the first reception confirmation information according to the timing information of the activation information;

sending, by the terminal device, the first reception confirmation information to the network device according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information; and the method further includes
- receiving, by the terminal device, the deactivation information from the network device according to the second identifier, where the deactivation information is used to indicate deactivating the semi-persistent configuration information;
- where the second identifier is the first-type identifier or the second-type identifier.

In one embodiment, the method further includes:
- deactivating, by the terminal device, the semi-persistent configuration information according to the deactivation information; and/or,
- determining, by the terminal device according to the deactivation information, that a multicast/broadcast communication mode of the terminal device is switched from a point to multi-point communication mode to a point to point communication mode.

In one embodiment, if the second identifier is the first-type identifier, the deactivation information further indicates switching a terminal device receiving the deactivation information from a point to multi-point communication mode to a point to point communication mode;
- if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, if the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;
- after receiving, by the terminal device, the deactivation information from the network device according to the second-type identifier, the method further includes:
- determining, by the terminal device, PUCCH resource information of second reception confirmation information according to the PUCCH resource information corresponding to the PDSCH;
- determining, by the terminal device, timing information of the second reception confirmation information according to the timing information of the activation information;
- sending, by the terminal device, the second reception confirmation information to the network device according to the PUCCH resource information and the timing information of the second reception confirmation information, where the second reception confirmation information is used to indicate whether the deactivation information is received successfully.

In one embodiment, the first identifier is obtained by scrambling the first-type identifier, and the activation information includes PUCCH resource indication information and timing information;
- after receiving, by the terminal device, the deactivation information from the network device according to the second identifier, the method further includes:
- determining, by the terminal device, PUCCH resource information of second reception confirmation information according to the PUCCH resource indication information of the activation information;
- determining, by the terminal device, timing information of the second reception confirmation information according to the timing information of the activation information;
- sending, by the terminal device, the second reception confirmation information to the network device according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a semi-persistent scheduling method for a multicast/broadcast service, and the method includes:
- sending, by a network device, semi-persistent configuration information for a multicast/broadcast service to N terminal devices, where the N terminal devices belong to a same terminal device group for the multicast/broadcast service, and N is an integer greater than or equal to 1, and where semi-persistent configuration information of each terminal device includes a first identifier and related information of a PDSCH for multicast/broadcast service transmission;
- sending, by the network device, activation information to the N terminal devices according to the first identifier, where the first identifier is a first-type identifier or a second-type identifier, the first-type identifier is used to identify a terminal device, and the second-type identifier is used to identify a terminal device group of a multicast/broadcast service which a terminal device belongs to, and where the activation information is used to indicate activating the semi-persistent configuration information;
- sending, by the network device, the PDSCH to the N terminal devices by multicast/broadcast according to the semi-persistent configuration information, where the PDSCH carries multicast/broadcast service data.

In one embodiment, a scrambling sequence of the PDSCH is obtained according to the second-type identifier, or,
- the semi-persistent configuration information further includes a third-type identifier, where the third-type identifier is used to generate a scrambling sequence of the PDSCH, and the scrambling sequence of the PDSCH is obtained according to the third-type identifier.

In one embodiment, after sending, by the network device, the PDSCH to the N terminal devices by multicast/broadcast according to the semi-persistent configuration information, the method further includes:
- receiving, by the network device, first reception confirmation information from the N terminal devices respectively, where the first reception confirmation information is used to indicate whether the PDSCH is received successfully.

In one embodiment, the first identifier is the first-type identifier, and the activation information includes PUCCH resource indication information and timing information;
    receiving, by the network device, the first reception confirmation information from the N terminal devices includes:
    determining, by the network device, PUCCH resource information of the first reception confirmation information according to the PUCCH resource indication information of the activation information;
    determining, by the network device, timing information of the first reception confirmation information according to the timing information of the activation information;
    receiving, by the network device, the first reception confirmation information from the terminal devices according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information; and the method further includes:
    sending, by the network device, the deactivation information to the N terminal devices according to the second identifier, where the deactivation information is used to indicate deactivating the semi-persistent configuration information;
    where the second identifier is the first-type identifier or the second-type identifier.

In one embodiment, the deactivation information is further used to indicate switching a multicast/broadcast communication mode of a terminal device from a point to multi-point communication mode to a point to point communication mode.

In one embodiment, if the deactivation information is obtained by scrambling according to the second-type identifier, the deactivation information further indicates switching terminal devices belonging to the terminal device group from a point to multi-point communication mode to a point to point communication mode;
    if the second identifier is the first-type identifier, the deactivation information further indicates switching a terminal device receiving the deactivation information from a point to multi-point communication mode to a point to point communication mode;
    if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, the second identifier is a second-type identifier, and the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the deactivation information includes timing information;
    after sending, by the network device, the deactivation information to the N terminal devices according to the second identifier, the method further includes:
    determining, by the network device, PUCCH resource information of second reception confirmation information according to the PUCCH resource information corresponding to the PDSCH;
    determining, by the network device, timing information of the second reception confirmation information according to the timing information of the deactivation information;
    receiving, by the network device, the second reception confirmation information from the terminal device according to the PUCCH resource information and the timing information of the second reception confirmation information, where the second reception confirmation information is used to indicate whether the deactivation information is received successfully.

In one embodiment, the first identifier is the first-type identifier, and the deactivation information includes PUCCH resource indication information and timing information;
    after sending, by the network device, the deactivation information to the N terminal devices according to the second identifier, the method further includes:
    determining, by the network device, PUCCH resource information of second reception confirmation information according to the PUCCH resource indication information of the deactivation information;
    determining, by the network device, timing information of the second reception confirmation information according to the timing information of the deactivation information;
    receiving, by the network device, the second reception confirmation information sent from the terminal devices according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a semi-persistent scheduling apparatus for a multicast/broadcast service, including a memory, a transceiver and a processor;
    the memory is configured to store a computer program;
    the transceiver is configured to transceive data under control of the processor;
    the processor is configured to read the computer program in the memory and execute the following operations:
    receiving semi-persistent configuration information for a multicast/broadcast service from a network device, where the semi-persistent configuration information includes a first identifier and related information of a PDSCH for multicast/broadcast service transmission;

receiving activation information from the network device according to the first identifier, where the activation information is used to indicate activating the semi-persistent configuration information, and the first identifier is a first-type identifier or a second-type identifier, where the first-type identifier is used to identify a terminal device, and the second-type identifier is used to identify a terminal device group of a multicast/broadcast service which a terminal device belongs to;

receiving the PDSCH from the network device according to the activation information and the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the processor further executes the following operations:

before receiving the PDSCH from the network device, activating the semi-persistent configuration information according to the activation information.

In one embodiment, the processor further executes the following operations:

after receiving the PDSCH from the network device according to the activation information and the semi-persistent configuration information, sending first reception confirmation information to the network device, where the first reception confirmation information is used to indicate whether the PDSCH is received successfully.

In one embodiment, the first identifier is the first-type identifier, and the activation information includes PUCCH resource indication information and timing information;

sending the first reception confirmation information to the network device includes:

determining PUCCH resource information of the first reception confirmation information according to the PUCCH resource indication information of the activation information;

determining timing information of the first reception confirmation information according to the timing information of the activation information;

sending the first reception confirmation information to the network device according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;

the processor further executes the following operations:

receiving the deactivation information from the network device according to the second identifier, where the deactivation information is used to indicate deactivating the semi-persistent configuration information;

where the second identifier is the first-type identifier or the second-type identifier.

In one embodiment, the processor further executes the following operations:

deactivating the semi-persistent configuration information according to the deactivation information; and/or, determining, according to the deactivation information, that a multicast/broadcast communication mode of the terminal device is switched from a point to multi-point communication mode to a point to point communication mode.

In one embodiment, if the second identifier is the first-type identifier, the deactivation information further indicates switching a terminal device receiving the deactivation information from a point to multi-point communication mode to a point to point communication mode;

if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, if the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the deactivation information includes timing information;

the processor further executes the following operations:

after receiving the deactivation information from the network device according to the second identifier, determining PUCCH resource information of second reception confirmation information according to the PUCCH resource information corresponding to the PDSCH;

determining timing information of the second reception confirmation information according to the timing information of the deactivation information;

sending the second reception confirmation information to the network device according to the PUCCH resource information and the timing information of the second reception confirmation information, where the second reception confirmation information is used to indicate whether the deactivation information is received successfully.

In one embodiment, the first identifier is obtained by scrambling the first-type identifier, and the activation information includes PUCCH resource indication information and timing information;

the processor further executes the following operations:

after receiving the deactivation information from the network device according to the second identifier, determining PUCCH resource information of second reception confirmation information according to the PUCCH resource indication information of the activation information;

determining timing information of the second reception confirmation information according to the timing information of the activation information;

sending the second reception confirmation information to the network device according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a semi-persistent scheduling apparatus for a multicast/broadcast service, including a memory, a transceiver and a processor;

the memory is configured to store a computer program;
the transceiver is configured to transceive data under control of the processor;
the processor is configured to read the computer program in the memory and execute the following operations:
sending semi-persistent configuration information for a multicast/broadcast service to N terminal devices, where the N terminal devices belong to a same terminal device group for the multicast/broadcast service, and N is an integer greater than or equal to 1, and where semi-persistent configuration information of each terminal device includes a first identifier and related information of a PDSCH for multicast/broadcast service transmission;
sending activation information to the N terminal devices according to the first identifier, where the first identifier is a first-type identifier or a second-type identifier, the first-type identifier is used to identify a terminal device, and the second-type identifier is used to identify a terminal device group of a multicast/broadcast service which a terminal device belongs to, and where the activation information is used to indicate activating the semi-persistent configuration information;
sending the PDSCH to the N terminal devices by multicast/broadcast according to the semi-persistent configuration information, where the PDSCH carries multicast/broadcast service data.

In one embodiment, a scrambling sequence of the PDSCH is obtained according to the second-type identifier, or,
the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the processor further executes the following operations:
after sending the PDSCH to the N terminal devices by multicast/broadcast according to the semi-persistent configuration information, receiving first reception confirmation information from the N terminal devices respectively, where the first reception confirmation information is used to indicate whether the PDSCH is received successfully.

In one embodiment, the first identifier is the first-type identifier, and the activation information includes PUCCH resource indication information and timing information;
receiving the first reception confirmation information from the N terminal devices includes:
determining PUCCH resource information of the first reception confirmation information according to the PUCCH resource indication information of the activation information;
determining timing information of the first reception confirmation information according to the timing information of the activation information;
receiving the first reception confirmation information from the terminal devices according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;
the processor further executes the following operations:
sending the deactivation information to the N terminal devices according to the second identifier, where the deactivation information is used to indicate deactivating the semi-persistent configuration information;
where the second identifier is the first-type identifier or the second-type identifier.

In one embodiment, the deactivation information is further used to indicate switching a multicast/broadcast communication mode of a terminal device from a point to multi-point communication mode to a point to point communication mode.

In one embodiment, if the deactivation information is obtained by scrambling according to the second-type identifier, the deactivation information further indicates switching terminal devices belonging to the terminal device group from a point to multi-point communication mode to a point to point communication mode;
if the second identifier is the first-type identifier, the deactivation information further indicates switching a terminal device receiving the deactivation information from a point to multi-point communication mode to a point to point communication mode;
if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, the second identifier is the second-type identifier, and the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the deactivation information includes timing information;
the processor further executes the following operations:
after sending the deactivation information to the N terminal devices according to the second-type identifier, determining PUCCH resource information of second reception confirmation information according to the PUCCH resource information corresponding to the PDSCH;

determining timing information of the second reception confirmation information according to the timing information of the deactivation information;

receiving the second reception confirmation information from the terminal devices according to the PUCCH resource information and the timing information of the second reception confirmation information, where the second reception confirmation information is used to indicate whether the deactivation information is received successfully.

In one embodiment, the first identifier is the first-type identifier, and the deactivation information includes PUCCH resource indication information and timing information;

the processor further executes the following operations:

after sending the deactivation information to the N terminal devices according to the second-type identifier, determining PUCCH resource information of second reception confirmation information according to the PUCCH resource indication information of the deactivation information;

determining timing information of the second reception confirmation information according to the timing information of the deactivation information;

receiving the second reception confirmation information sent from the terminal devices according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a semi-persistent scheduling apparatus for a multicast/broadcast service, including:

a receiving device, configured to: receive semi-persistent configuration information for a multicast/broadcast service from a network device, where the semi-persistent configuration information includes a first identifier and related information of a PDSCH for multicast/broadcast service transmission; receive activation information from the network device according to the first identifier, where the activation information is used to indicate activating the semi-persistent configuration information, and the first identifier is a first-type identifier or a second-type identifier, where the first-type identifier is used to identify a terminal device, and the second-type identifier is used to identify a terminal device group of a multicast/broadcast service which a terminal device belongs to; receive the PDSCH from the network device according to the activation information and the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the apparatus further includes:

a processing device, configured to activate the semi-persistent configuration information according to the activation information before the receiving device receives the PDSCH from the network device.

In one embodiment, the apparatus further includes:

a sending device, configured to send first reception confirmation information to the network device after the receiving device receives the PDSCH from the network device according to the activation information and the semi-persistent configuration information, where the first reception confirmation information is used to indicate whether the PDSCH is received successfully.

In one embodiment, the first identifier is the first-type identifier, and the activation information includes PUCCH resource indication information and timing information;

the sending device is configured to:

determine PUCCH resource information of the first reception confirmation information according to the PUCCH resource indication information of the activation information;

determine timing information of the first reception confirmation information according to the timing information of the activation information;

send the first reception confirmation information to the network device according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;

the receiving device is further configured to receive the deactivation information from the network device according to the second identifier, where the deactivation information is used to indicate deactivating the semi-persistent configuration information;

where the second identifier is the first-type identifier or the second-type identifier.

In one embodiment, the apparatus further includes:

a processing device, configured to: deactivate the semi-persistent configuration information according to the deactivation information; and/or, determine, according to the deactivation information, that a multicast/broadcast communication mode of the terminal device is switched from a point to multi-point communication mode to a point to point communication mode.

In one embodiment, if the second identifier is the first-type identifier, the deactivation information further indicates switching a terminal device receiving the deactivation information from a point to multi-point communication mode to a point to point communication mode;

if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, if the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the deactivation information includes timing information;

the sending device is further configured to: after the receiving device receives the deactivation information from the network device according to the second-type identifier, determine PUCCH resource information of second reception confirmation information according to the PUCCH resource information corresponding to the PDSCH; determine timing information of the second reception confirmation information according to the timing information of the activation information; send the second reception confirmation information to the network device according to the PUCCH resource information and the timing information of the second reception confirmation information, where the second reception confirmation information is used to indicate whether the deactivation information is received successfully.

In one embodiment, the first identifier is obtained by scrambling the first-type identifier, and the activation information includes PUCCH resource indication information and timing information;

the sending device is further configured to: after the receiving device receives the deactivation information from the network device according to the second-type identifier, determine PUCCH resource information of second reception confirmation information according to the PUCCH resource indication information of the activation information; determine timing information of the second reception confirmation information according to the timing information of the activation information; send the second reception confirmation information to the network device according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a semi-persistent scheduling apparatus for a multicast/broadcast service, including:

a sending device, configured to: send semi-persistent configuration information for a multicast/broadcast service to N terminal devices, where the N terminal devices belong to a same terminal device group for the multicast/broadcast service, and N is an integer greater than or equal to 1, and where semi-persistent configuration information of each terminal device includes a first identifier and related information of a PDSCH for multicast/broadcast service transmission; send activation information to the N terminal devices according to the first identifier, where the first identifier is a first-type identifier or a second-type identifier, the first-type identifier is used to identify a terminal device, and the second-type identifier is used to identify a terminal device group of a multicast/broadcast service which a terminal device belongs to, and where the activation information is used to indicate activating the semi-persistent configuration information; send the PDSCH to the N terminal devices by multicast/broadcast according to the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the apparatus further includes:

a receiving device, configured to receive first reception confirmation information from the N terminal devices respectively after the sending device sends the PDSCH to the N terminal devices by multicast/broadcast according to the semi-persistent configuration information, where the first reception confirmation information is used to indicate whether the PDSCH is received successfully.

In one embodiment, the first identifier is the first-type identifier, and the activation information includes PUCCH resource indication information and timing information;

the receiving device is configured to:

determine PUCCH resource information of the first reception confirmation information according to the PUCCH resource indication information of the activation information;

determine timing information of the first reception confirmation information according to the timing information of the activation information;

receive the first reception confirmation information from the terminal devices according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;

the sending device is further configured to send the deactivation information to the N terminal devices according to the second identifier, where the deactivation information is used to indicate deactivating the semi-persistent configuration information;

where the second identifier is the first-type identifier or the second-type identifier.

In one embodiment, the deactivation information is further used to indicate switching a multicast/broadcast communication mode of a terminal device from a point to multi-point communication mode to a point to point communication mode.

In one embodiment, if the deactivation information is obtained by scrambling according to the second-type identifier, the deactivation information further indicates switching terminal devices belonging to the terminal device group from a point to multi-point communication mode to a point to point communication mode;

if the second identifier is the first-type identifier, the deactivation information further indicates switching a terminal device receiving the deactivation information from a point to multi-point communication mode to a point to point communication mode;

if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, the second identifier is the second-type identifier, and the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;

the apparatus further includes:

a receiving device, configured to: after the sending device sends the deactivation information to the N terminal devices according to the second identifier, determine PUCCH resource information of second reception confirmation information according to the PUCCH resource information corresponding to the PDSCH; determine timing information of the second reception confirmation information according to the timing information of the activation information; receive the second reception confirmation information from the terminal devices according to the PUCCH resource information and the timing information of the second reception confirmation information, where the second reception confirmation information is used to indicate whether the deactivation information is received successfully.

In one embodiment, the first identifier is the first-type identifier, and the activation information includes PUCCH resource indication information and timing information;

the apparatus further includes:

a receiving device, configured to: after the sending device sends the deactivation information to the N terminal devices according to the second identifier, determine PUCCH resource information of second reception confirmation information according to the PUCCH resource indication information of the activation information; determine timing information of the second reception confirmation information according to the timing information of the activation information; receive the second reception confirmation information sent from the terminal devices according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

In one embodiment of the present application provides a processor-readable storage medium, where the processor-readable storage medium stores a computer program, and the computer program is used to cause a processor to execute the method according to the embodiments of the disclosure.

In one embodiment of the present application provides a computer program product including instructions, where the instructions, when run on a computer, cause the computer to execute the method according to the embodiments of the disclosure.

In one embodiment of the present application provides a semi-persistent scheduling system for a multicast/broadcast service, which includes a network device as described in any of the above and at least one terminal device as described in any of the above.

The present application provides a semi-persistent scheduling method for a multicast/broadcast service, an apparatus and a storage medium. The network device configures the semi-persistent configuration information to the terminal devices in advance, and the semi-persistent configuration information includes the first identifier for scrambling the activation information and the related information of the PDSCH for multicast/broadcast service transmission. Every time multicast/broadcast service data transmission is required, the network device sends the activation information to the terminal devices according to the first identifier to indicate activating the semi-persistent configuration information, and then sends the PDSCH to the terminal devices by multicast/broadcast according to the semi-persistent configuration information, to realize that multicast/broadcast service data is transmitted from the network device to the N terminal devices by multicast/broadcast. Since the semi-persistent configuration information is received by the terminal devices from the network device in advance and saved locally, and is activated by the activation information scrambled by the first identifier, there is no need to receive the semi-persistent configuration information from the network device every time the multicast/broadcast service data is transmitted, to save the air interface resources.

It should be understood that the content described in the SUMMARY section is not intended to limit essential or important features of the embodiments of the present disclosure, nor is it intended to limit the scope of the present disclosure. Other features of the present disclosure will be readily understood from the following description.

BRIEF DESCRIPTION OF DRAWINGS

In order to explain technical solutions in the present application or in the prior art more clearly, drawings required to be used in the description of embodiments or the prior art will be introduced briefly in the following. The drawings in the following description are some embodiments of the present disclosure.

DESCRIPTION OF EMBODIMENTS

Figure 1:
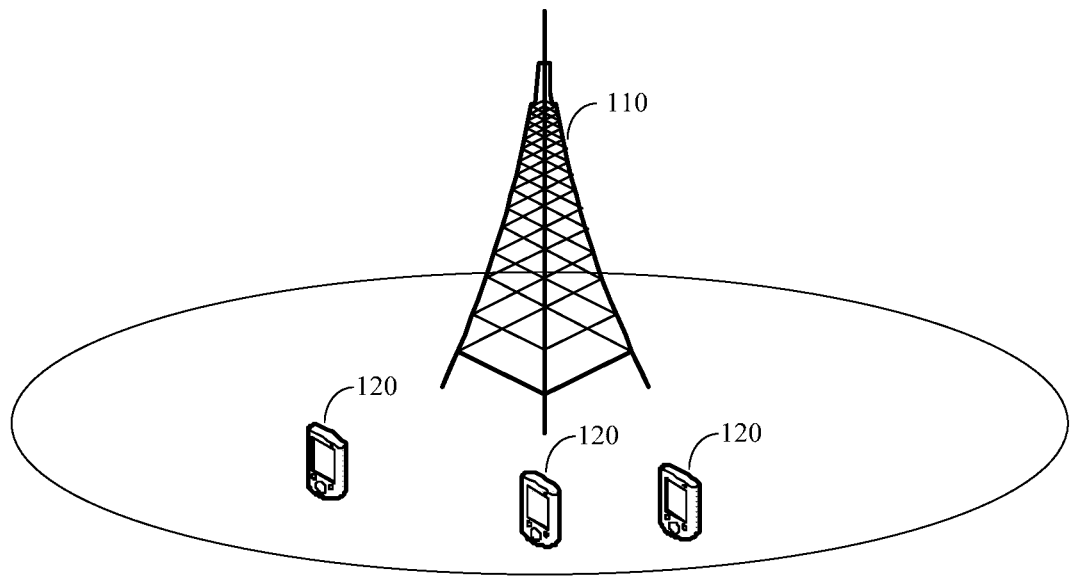
FIG. 1 is a schematic diagram of an application scenario provided by an embodiment of the present application.

In the present application, the term "and/or" describes an association relationship of associated objects, and means that there may be three relationships. For example, "A and/or B" may represent three situations, namely, A exists alone, A and B exist at the same time, and B exists alone. The character "/" generally means that the associated objects before and after the character is of an "or" relationship.

The term "multiple" in embodiments of the present application refers to two or more than two, and other quantifiers are similar to it.

The technical solutions in embodiments of the present application will be described clearly and comprehensively in combination with accompanying drawings in the embodiments of the present application. The described embodiments are only part of the embodiments of the present application, not all of them.

The embodiments of the present application provide a semi-persistent scheduling (SPS) method for a multicast/broadcast service, an apparatus and a storage medium. A network device configures semi-persistent configuration information for terminal devices in advance, and the semi-persistent configuration information includes a first identifier (a first-type identifier or a second-type identifier) and related information of a PDSCH for sending a multicast/broadcast service. When multicast/broadcast service data transmission is required, the network device then sends activation information to the terminal devices to indicate activating the semi-persistent configuration information. Then the network device and the terminal devices conduct multicast/broadcast service communication according to the semi-persistent configuration information. Since some configuration information is received by the terminal devices from the network device in advance and saved locally, there is no need to receive it again from the network device every time the multicast/broadcast service data is transmitted, to save air interface resources.

It should be noted that the "semi-persistent" involved in the present application may also be called "semi-static".

The methods and the apparatuses are based on a same application concept. Since the methods and the apparatuses solve the problem with similar principles, the implementation of the apparatuses and the methods can be referred to for each other, and the repetition is not repeated here.

The technical solutions provided by the embodiments of the present application can be applied to various systems, especially a 5G system. For example, an applicable system may be a global system of mobile communication (GSM), a code division multiple access (CDMA) system, a wideband code division multiple access (WCDMA), a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. The various systems include a terminal device and a network device. The system may also include a core network part, such as an evolved packet system (EPS), a 5G system (5GS), etc.

The terminal device involved in the embodiments of the present application may refer to a device that provides voice and/or data connectivity to a user, a handheld device with a wireless connection function, or other processing devices connected to a wireless modem, etc. The name of the terminal device may be different in different systems. For example, in the 5G system, the terminal device may be called a user equipment (UE). A wireless terminal device may communicate with one or more core networks (CNs) via a radio access network (RAN). The wireless terminal device may be a mobile terminal device, such as a mobile phone (or "cellular" phone) and a computer with a mobile terminal device. For example, the mobile terminal device may be a portable, pocket-sized, handheld, computer-built or vehicle-mounted mobile apparatus, which exchange voice and/or data with a radio access network, such as a personal communication service (PCS) phone, a cordless phone, a session initiated protocol (SIP) phone, a wireless local loop (WLL) station, a personal digital assistant (PDA) and other devices. The wireless terminal device may also be called a system, a subscriber unit, a subscriber station, a mobile station, a mobile, a remote station, an access point, a remote terminal, an access terminal, a user terminal device, a user agent, a user device, which is not limited in the embodiments of the present application.

The network device involved in the embodiments of the present application may be a base station, and the base station may include multiple cells providing services for a terminal. Depending on a specific application, the base station may also be called an access point, or a device in an access network that communicates with a wireless terminal device through one or more sectors on an air interface, or other names. The network may be configured to exchange a received over-the-air frame with an Internet protocol (IP) packet, and act as a router between the wireless terminal device and the rest of the access network, where the rest of the access network may include an Internet protocol (IP) communication network. The network device may also coordinate a property management of the air interface. For example, the network device involved in the embodiments of the present application may be a network device (Base Transceiver Station, BTS) in a global system for mobile communications (GSM) or code division multiple access (CDMA) system; may also be a network device (NodeB) in wide-band code division multiple access (WCDMA); may also be an evolutional network device (evolutional Node B, eNB or e-NodeB) in a long term evolution (LTE) system, a 5G base station (gNB) in a 5G network architecture (next generation system); and may also be a home evolved base station (HeNB), a relay node, a home base station (femto), a pico base station (pico), etc., which is not limited in the embodiments of the present application. In some network structures, the network device may include a centralized unit (CU) node and a distributed unit (DU) node, and the centralized unit and distributed unit may also be geographically separated.

One or more antennas may be used by the network device and the terminal device respectively for multi input multi output (MIMO) transmission therebetween, and the MIMO transmission may be single user MIMO (SU-MIMO) or multiple user MIMO (MU-MIMO).

Depending on the morphology and number of root antenna combinations, the MIMO transmission may be 2D-MIMO, 3D-MIMO, FD-MIMO or massive-MIMO, and may also be diversity transmission or precoding transmission or beamforming transmission, etc.

FIG. 1 is a schematic diagram of an application scenario provided by an embodiment of the present application. As shown in FIG. 1, this embodiment provides a communication system 100, and the communication system 100 includes a network device 110 and multiple terminal devices 120. This embodiment takes three terminal devices 120 as an example. These terminal devices 120 belong to a same terminal device group for a multicast/broadcast service. The network device 110 can send service data to these terminal devices 120 simultaneously by multicast/broadcast, where the service data is carried in a PDSCH.

The following embodiments are adopted to describe how to schedule the PDSCH to transmit the service data.

Figure 2:
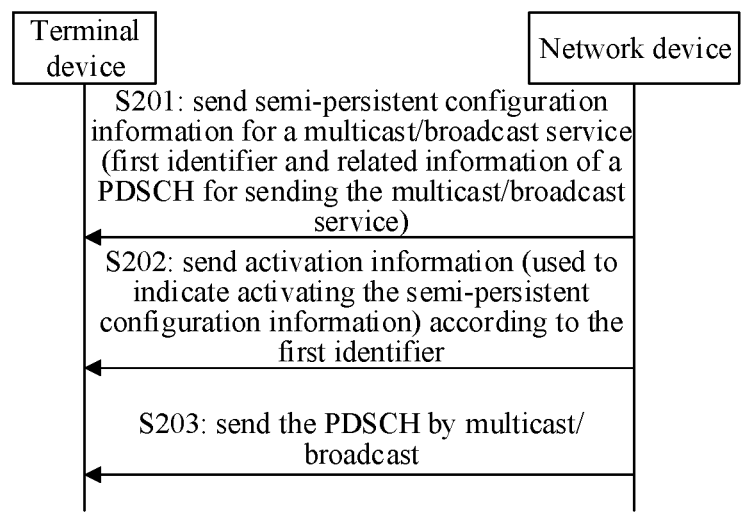
FIG. 2 is a flowchart of a semi-persistent scheduling method for a multicast/broadcast service provided by an embodiment of the present application.

FIG. 2 is a flowchart of a semi-persistent scheduling method for a multicast/broadcast service provided by an embodiment of the present application. As shown in FIG. 2, the method of this embodiment can include the following steps.

S201: a network device sends semi-persistent configuration information for a multicast/broadcast service to each terminal device of N terminal devices. Accordingly, each terminal device of the N terminal devices receives the semi-persistent configuration information for the multicast/broadcast service from the network device.

In this embodiment, FIG. 2 is shown by taking one of the N terminal devices as an example, and other terminal devices are similar.

In this embodiment, the N terminal devices belong to a same terminal device group for the multicast/broadcast service, where N is an integer greater than or equal to 1, and semi-persistent configuration information of each terminal device includes a first identifier and related information of a PDSCH for multicast/broadcast service transmission. The first identifier is used to scramble activation information.

The first identifier may be a first-type identifier or a second-type identifier.

The first-type identifier is used to identify a corresponding terminal device, and the first-type identifier is, for example, a configured scheduling radio network temporary identifier (CS-RNTI). First-type identifiers of different terminal devices are different. The second-type identifier is used to identify a terminal device group of a multicast/broadcast service which a terminal device belongs to, and the second-type identifier is, for example, a group configured scheduling radio network temporary identifier (GCS-RNTI).

Second-type identifiers of terminal devices belonging to the same terminal device group for the multicast/broadcast service are the same. That is, the second-type identifiers of the semi-persistent configuration information of the N terminal devices are the same identifier.

The network device sends, to each terminal device, semi-persistent configuration information of the terminal device in advance. Accordingly, each terminal device receives the semi-persistent configuration information from the network device.

The network device may send the semi-persistent configuration information to the terminal device through a higher-layer signaling. For example, the network device sends the semi-persistent configuration information to the terminal device through a radio resource control (RRC) message. The network device may send the semi-persistent configuration information to the terminal device through one or more RRC messages.

S202: the network device sends activation information to the N terminal devices according to the first identifier. Accordingly, each terminal device receives the activation information from the network device.

In this embodiment, each terminal device receives the semi-persistent configuration information from the network device and saves it locally, and the network device indicates when the semi-persistent configuration information needs to be used. Every time when the network device needs to schedule the PDSCH to transmit multicast/broadcast service data, the network device sends the activation information to each terminal device according to the first identifier in the semi-persistent configuration information. The activation information is used to indicate activating the semi-persistent configuration information, that is, the activation information indicates that scheduling of the semi-persistent configuration information takes effect in a physical layer, i.e., the terminal device can receive the PDSCH according to the semi-persistent configuration information and the activation information. Accordingly, after receiving the activation information, each terminal device determines that the semi-persistent configuration information can be used for communication with the network device for the multicast/broadcast service.

In a possible implementation of the above S202, the first identifier is the first-type identifier, and the first-type identifier is a UE-specific identifier (for example, a CS-RNTI). The network device sends the activation information to respective terminal devices according to the first-type identifiers of the terminal devices, respectively. Accordingly, each terminal device receives the activation information from the network device according to the first-type identifier of the terminal device. In this implementation, the activation information received by the terminal device is obtained by scrambling using the first-type identifier of the terminal device (such as the CS-RNTI of the terminal device). Indication information for indicating scrambling the activation information using the first-type identifier is further included in the above semi-static configuration.

In this embodiment, the network device sends the activation information to each terminal device respectively, and related information about the terminal device can be added to the activation information, which can increase an amount of information carried in the activation information, increase the flexibility of scheduling of air interface resource, and improve the user experience.

In another possible implementation of the above S202, the first identifier is the second-type identifier, and the second-type identifier is a common identifier of the terminal device group, such as a GCS-RNTI. The network sends one piece of activation information to the terminal device group according to the second-type identifier. Accordingly, each terminal device in the terminal device group receives the activation information from the network device according to the second-type identifier. In this implementation, the activation information received by each terminal device is obtained by scrambling using the second-type identifier (such as the GCS-RNTI) in the semi-static configuration information. Indication information for indicating scrambling the activation information using the second-type identifier is further included in the above semi-static configuration.

Therefore, the network device can indicate, to multiple terminal devices, activating the semi-persistent configuration information by sending the same activation information, which reduces scheduling signaling resources and saves the air interface resources.

S203: the network device sends the PDSCH to the N terminal devices by multicast/broadcast according to the semi-persistent configuration information and the activation information. Accordingly, each terminal device of the N terminal devices receives the PDSCH for the multicast/broadcast service from the network device.

In this embodiment, after sending the activation information to the N terminal devices, the network device sends the PDSCH to the N terminal devices by multicast/broadcast according to the semi-persistent configuration information. Accordingly, after receiving the activation information, each terminal device receives the PDSCH from the network device according to the semi-persistent configuration information and the activation information. The PDSCH carries multicast/broadcast service data, and each terminal device acquires the multicast/broadcast service data from the network device through the PDSCH.

The activation information may include frequency domain resource indication information and time domain resource indication information of the PDSCH. After receiving the activation information, the terminal device determines frequency domain resource information of the PDSCH according to the frequency domain resource indication information of the PDSCH in the activation information; determines time domain resource information of the PDSCH according to the time domain resource indication information of the PDSCH in the activation information; and then receives the PDSCH from the network device according to the frequency domain resource information and the time domain resource information. The frequency domain resource indication information of the PDSCH in each piece of activation information indicates a same frequency domain resource, and the time domain resource indication information of the PDSCH in each piece of activation information indicates a same time domain resource.

In a possible implementation, a scrambling sequence of the PDSCH can be obtained according to the second-type identifier. In one embodiment, the network device obtains the scrambling sequence of the PDSCH according to the second-type identifier (such as the GCS-RNTI), scrambles the PDSCH according to the scrambling sequence, and then sends a scrambled PDSCH to the N terminal devices by multicast/broadcast. Accordingly, each terminal device obtains a descrambling sequence of the PDSCH according to the second-type identifier, and descrambles a received PDSCH according to the descrambling sequence. Thus, it is realized that multicast/broadcast service data is transmitted by multicast/broadcast from the network device to the N terminal devices.

The semi-persistent configuration information of the terminal device further includes indication information for indicating obtaining the scrambling sequence of the PDSCH by the second-type identifier (such as the GCS-RNTI).

In another possible implementation, semi-persistent configuration information further includes a third-type identifier. The third-type identifier is, for example, a group radio network temporary identifier (G-RNTI), and the third-type identifier is used to generate the scrambling sequence of the PDSCH, the third-type identifier defaults to 0 or other default values. Accordingly, the scrambling sequence of the PDSCH can be obtained according to the third-type identifier. In one embodiment, the network device obtains the scrambling sequence of the PDSCH according to the third-type identifier (e.g., the G-RNTI), scrambles the PDSCH according to the scrambling sequence, and then sends a scrambled PDSCH to the N terminal devices by multicast/broadcast. Accordingly, each terminal device obtains a descrambling sequence of the PDSCH according to the third-type identifier, and descrambles a received PDSCH according to the descrambling sequence. Thus, it is realized that multicast/broadcast service data is transmitted by multicast/broadcast from the network device to the N terminal devices.

A scrambling code of relevant PDSCH data uses the G-RNTI as a parameter of a scrambling code sequence, for example, as shown in the following Formula 1:

$$\tilde{b}^{(q)}(i)=(b^{(q)}(i)+c^{(q)}(i)) \bmod 2 \qquad \text{Formula 1}$$

where $b^{(q)}(i)$ is a data bit before PDSCH scrambling, $\tilde{b}^{(q)}(i)$ is a data bit after PDSCH scrambling, $c^{(q)}(i)$ is a scrambling code sequence, and q is 0 or 1. $c^{(q)}(i)$ is obtained according to an initialization parameter $C_{init}$, and description in the related art can be referred to for how to obtain $c^{(q)}(i)$ according to $C_{init}$, which will not be repeated here.

$C_{init}$ is generated using the following Formula 2:

$$C_{init}=n_{RNTI}*2^{15}+q*2^{14}+n_{ID} \qquad \text{Formula 2}$$

where $C_{init}$ is the initialization parameter of the scrambling code sequence, no is a value configured by a higher layer, values of $n_{RNTI}$ of the terminal devices belonging to the terminal device group for the multicast/broadcast service are the same, $n_{RNTI}$ is equal to the G-RNTI, and values of $n_{ID}$ of the terminal devices belonging to the terminal device group for the multicast/broadcast service are the same.

For a case that a scrambling code of the relevant PDSCH data uses the GCS-RNTI as a parameter of a scrambling code sequence, it is similar to the above case of using the G-RNTI as the parameter of the scrambling code sequence, which will not be repeated here.

In the semi-persistent scheduling method for a multicast/broadcast service provided by this embodiment, the network device configures the semi-persistent configuration information to the terminal devices in advance, and the semi-persistent configuration information includes the first identifier (the first-type identifier or the second-type identifier) for scrambling the activation information and the related information of the PDSCH for multicast/broadcast service transmission. Every time multicast/broadcast service data transmission is required, the network device then sends the activation information to the terminal devices according to the first identifier to indicate activating the semi-persistent configuration information, and then the network device sends the PDSCH to the terminal devices by multicast/broadcast according to the semi-persistent configuration information, to realize that multicast/broadcast service data is transmitted from the network device to the N terminal devices by multicast/broadcast. Since the semi-persistent configuration information is received by the terminal devices from the network device in advance and saved locally, and is activated by the activation information scrambled by the first identifier, there is no need to receive the semi-persistent configuration information again from the network device every time the multicast/broadcast service data is transmitted, to save the air interface resources.

On the basis of any of the above embodiments, after receiving the activation information from the network device and before receiving the PDSCH from the network device, each terminal device activates the semi-persistent configuration information of the terminal device according to the received activation information. After the semi-persistent configuration information is activated, each terminal device receives the PDSCH from the network device according to the semi-persistent configuration information.

For example, a flag bit is used to indicate whether the semi-persistent configuration information is activated. After receiving the activation information, the terminal device changes the flag bit to a value indicating that the semi-persistent configuration information is activated.

Figure 3:
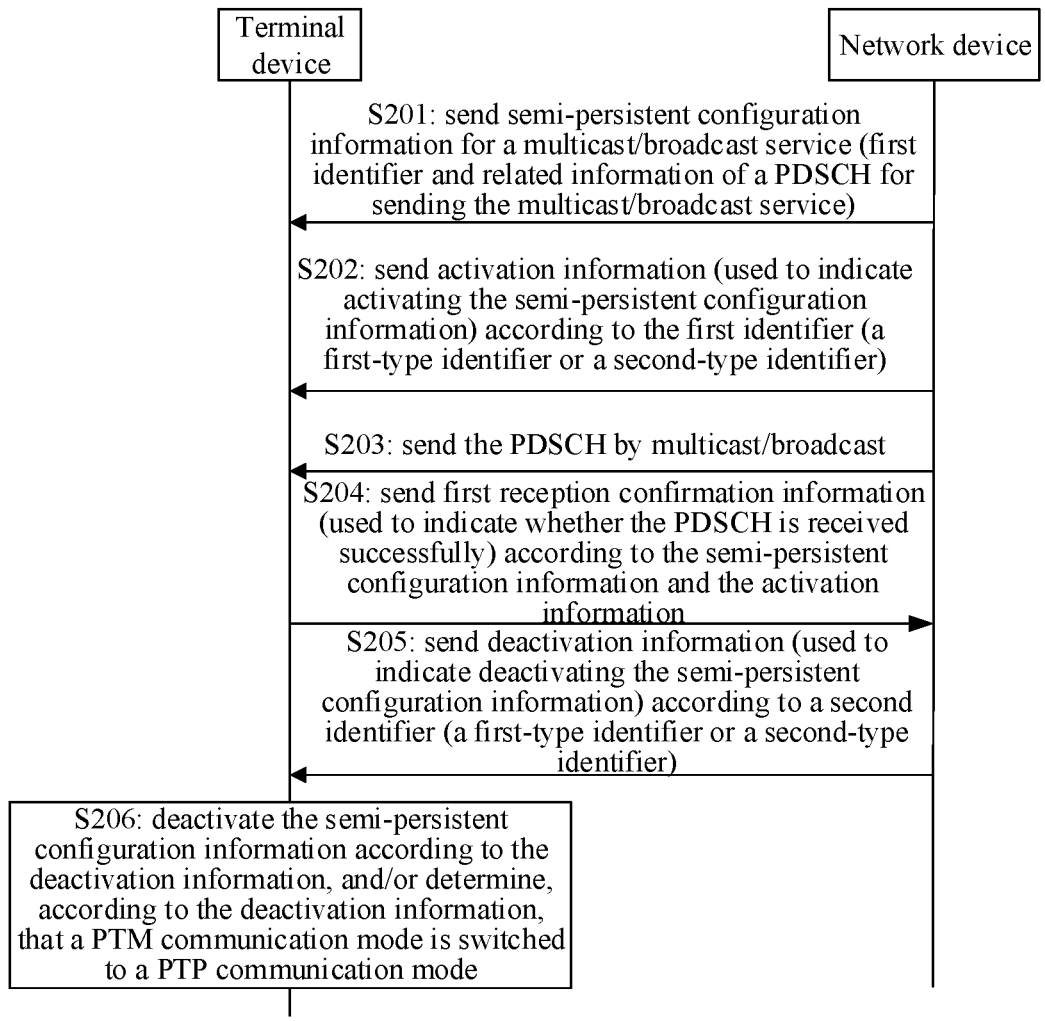
FIG. 3 is a flowchart of a semi-persistent scheduling method for a multicast/broadcast service provided by another embodiment of the present application.

FIG. 3 is a flowchart of a semi-persistent scheduling method for a multicast/broadcast service provided by another embodiment of the present application. As shown in FIG. 3, on the basis of any of the above embodiments, this embodiment further includes the following steps after executing S203 shown in FIG. 2.

S204: the terminal devices send first reception confirmation information to the network device according to the semi-persistent configuration information and the activation information. Accordingly, the network device receives the first reception confirmation information from the terminal devices according to the semi-persistent configuration information of each terminal device.

The first reception confirmation information is used to indicate whether the PDSCH is received successfully. Being received successfully here represents that the terminal device decodes the received PDSCH correctly. If the first reception confirmation information of the terminal device indicates that the PDSCH is received successfully, the network device does not retransmit the PDSCH. If the first reception confirmation information of the terminal device indicates that the PDSCH is not received successfully, the network device retransmits the PDSCH.

The first reception confirmation information is, for example, hybrid automatic repeat request (HARQ) feedback information. If data carried in the received PDSCH and decoded by the terminal device is correct, the HARQ feedback information is HARQ-ACK. If the data carried in the received PDSCH and decoded by the terminal device is wrong, the HARQ feedback information is negative acknowledge (NACK).

Therefore, in this embodiment, the reliability of multicast/broadcast service data can be improved through the first reception confirmation information, to meet different transmission quality requirements of different services.

In one embodiment, if the first identifier is the first-type identifier, that is, the activation information received by the terminal device is obtained by scrambling using the first-type identifier (such as the CS-RNTI) of the terminal device, then the sending of the first reception confirmation information by the terminal device to the network device includes the following possible implementations.

In a possible implementation, the activation information received by the terminal device includes PUCCH resource indication information and timing information.

Correspondingly, after receiving the activation information, the terminal device determines PUCCH resource information of the first reception confirmation information according to the PUCCH resource indication information of the activation information. For example, the semi-persistent configuration information includes total PUCCH resource information related to the terminal device. The terminal device determines a PUCCH resource indicated by the PUCCH resource indication information from the total PUCCH resource information, and takes the determined PUCCH resource as the PUCCH resource information for the first reception confirmation information. The terminal device further determines timing information of the first reception confirmation information according to the timing information of the activation information, such as taking the timing information of the activation information as the timing information of the first reception confirmation information. Then the terminal device sends the first reception confirmation information to the network device according to the determined PUCCH resource and the timing information of the first reception confirmation information.

Accordingly, for each terminal device, the network device determines the PUCCH resource information of the first reception confirmation information according to the PUCCH resource indication information of the activation information; determines the timing information of the first reception confirmation information according to the timing information of the activation information; and then receives the first reception confirmation information from the terminal device according to the PUCCH resource information and the timing information of the first reception confirmation information.

In another possible implementation, the related information of the PDSCH in the semi-persistent configuration information of the terminal device includes: PUCCH resource information corresponding to the PDSCH, and the activation information includes timing information. Correspondingly, after receiving the activation information, the terminal device determines PUCCH resource information of the first reception confirmation information according to the PUCCH resource information corresponding to the PDSCH in the semi-persistent configuration information. For example, the PUCCH resource information corresponding to the PDSCH in the semi-persistent configuration information is determined as the PUCCH resource information of the first reception confirmation information. The terminal device further determines timing information of the first reception confirmation information according to the timing information of the activation information, such as taking the timing information of the activation information as the timing information of the first reception confirmation information. Then the terminal device sends the first reception confirmation information to the network device according to the determined PUCCH resource and the timing information of the first reception confirmation information.

Accordingly, for each terminal device, the network device determines the PUCCH resource information of the first reception confirmation information according to the PUCCH resource information corresponding to the PDSCH in the semi-persistent configuration information; determines the timing information of the first reception confirmation information according to the timing information of the activation information; and then receives the first reception confirmation information from the terminal device according to the PUCCH resource information and the timing information of the first reception confirmation information.

In this embodiment, the network device also sends the PDSCH once at the same time when sending the activation information to the terminal devices. Therefore, when the terminal devices feed the first reception confirmation information of this PDSCH back to the network device, the first reception confirmation information is further used to indicate whether the activation information is received successfully.

Therefore, in this embodiment, how to feed the first reception confirmation information of the PDSCH back to the network device is determined by means of the activation information without special control signaling, thus saving air interface resources.

In another optional example, if the first identifier is the second-type identification, that is, the activation information received by the terminal device is obtained by scrambling using the second-type identification (such as the GCS-RNTI), then the feedback of the first reception confirmation information by the terminal device to the network device includes the following implementations.

In a possible implementation, the terminal device does not send the first reception confirmation information to the network device. The terminal device does not send reception confirmation information indicating whether the activation information is received successfully to the network device, either. In one embodiment, the network device may send the activation information to the terminal devices for multiple consecutive times according to the second-type identifier to ensure that the terminal devices can receive the activation information.

In another possible implementation mode, if the network device pre-configures a feedback resource of the reception confirmation information for each terminal device, the first reception confirmation information can be fed back according to the pre-configured feedback resource and the PUCCH resource indication information and timing information of the activation information.

In this embodiment, the network device also sends the PDSCH once at the same time when sending the activation information to the terminal devices. Therefore, when the terminal devices feed the first reception confirmation information of this PDSCH back to the network device, the first reception confirmation information is further used to indicate whether the activation information is received successfully.

For example, the network device configures multiple PUCCH resources, such as N PUCCH resources, for each terminal device through a higher-layer message, and the PUCCH resources mainly include the following contents:
 a PUCCH format;
 a starting resource block (RB) position: represent a position of the PUCCH resource in a frequency domain when being allocated;
 a starting symbol and a symbol length: time domain information of PUCCH channel;
 the number of initial cyclic shift is L;
 the number of orthogonal sequences is M;
 a terminal device feedback index: the terminal device calculates a resource position of its own feedback for PUCCH.

Among them:
The PUCCH format: represent a channel format used, which can be divided into format 0, format 1, format 2, format 3, etc. Different formats have different application scenarios (different loads and/or coverages). For example, format 0 supports feedback of a small amount of bits (1-2), which is suitable for the terminal device close to the network device. Format 1 indicates feedback of a small amount of bits (1-2), which is suitable for the terminal device far away from the network device.

The number of initial cyclic shift L: represent the number of supported users from a channel initial cyclic shift dimension. If not defined, L is equal to 1, for example.

The number of orthogonal sequences M: represent the number of supported users from a channel orthogonal sequence dimension. If not defined, M is considered equal to 1, for example.

The terminal device feedback index: used for the terminal device to calculate a channel resource position where feedback HARQ-ACK is located.

For example, the above format defines N*L*M channel resources that can be used to feed back HARQ-ACK (1 bit) information (a calculation order may be: firstly the orthogonal sequence number, then the initial cyclic shift, and finally the PUCCH channel number).

The terminal device with the index number "index" corresponds to an information resource in the N*L*M channel resources, a calculation process of which can be expressed as follows:

PUCCH channel number $n=\text{index}/(N^*L)$, $x=\text{mod}(\text{index},N^*L)$ cyclic shift number $c=x/M$; $y=\text{mod}(x,M)$ orthogonal sequence number $o=y$.

In one embodiment, the calculation order of the channel resources may also be: firstly the initial cyclic shift, then the orthogonal sequence number, and finally the PUCCH channel number.

In this way, the time-frequency resource of the first reception confirmation information is determined.

On the basis of any of the above embodiments, the first identifier is the second-type identifier, that is, the activation information received by the terminal device is obtained by scrambling using the second-type identifier (such as the GCS-RNTI), then the activation information is further used to indicate that downlink control information and/or deactivation information obtained by scrambling using the second-type identifier is not required to be detected within a preset time period. The deactivation information is used to indicate deactivating the semi-persistent configuration information, that is, to indicate that scheduling of the semi-persistent configuration information is invalid in the physical layer, i.e., the terminal device no longer receives the PDSCH according to the semi-persistent configuration information and the activation information.

After sending the activation information obtained by scrambling using the second-type identifier, the network device no longer sends the downlink control information obtained by scrambling using the second-type identifier within the preset time period. After receiving the activation information obtained by scrambling using the second-type identifier, the terminal device stops detecting the downlink control information obtained by scrambling using the second-type identifier within the preset time period.

Therefore, power consumption caused by blind detection of a control channel of the terminal device can be reduced, and a power saving effect of the terminal device can be achieved.

The following describes an example in which the activation information includes indication information with a length of 6 bits to indicate: the downlink control information obtained by scrambling using the second-type identifier is not required to be detected within the preset time period.

In a First Example

First bit: indicate a time unit for counting when the downlink control information obtained by scrambling using the second-type identifier is not detected. For example, 0 indicates a preset detection time unit, and 1 indicates that the time unit is a radio frame (10 ms).

Last five bits: indicate a time period when the downlink control information obtained by scrambling using the second-type identifier is not detected. For example, 11111 indicates 64 time units. 00000 indicates 0 time units.

For example, when the first bit is 0 and the last five bits are 11111, it is indicated that after receiving the activation information, the terminal device does not need to detect the downlink control information, such as the deactivation information, obtained by scrambling using the second-type identifier within a time period of subsequent 64 radio frames (i.e., 64 ms).

In a Second Example

First bit: indicate a time unit for counting when the downlink control information obtained by scrambling using the second-type identifier is not detected. For example, 0 indicates that the time unit is a radio frame (10 ms), and 1 indicates that the time unit is a radio superframe (1024 radio frames).

Last five bits: indicate a time period when the downlink control information obtained by scrambling using the second-type identifier is not detected. For example, 11111 indicates 64 time units. 00000 indicates 0 time units.

For example, when the first bit is 1 and the last five bits are 11111, it is indicated that after receiving the activation information, the terminal device does not need to detect the downlink control information, such as the deactivation information, obtained by scrambling using the second-type identifier within a time period of subsequent 64 radio superframes (i.e., 7*1024=71680 ms).

On the basis of the above embodiments and referring to FIG. 3, after the network device sends the activation information to the terminal devices, the following step may be further included:

S205: the network device sends deactivation information to the terminal devices according to the second identifier, where the deactivation information is further used to indicate deactivating the semi-persistent configuration information for the multicast/broadcast service. Accordingly, the terminal device receives the deactivation information from the network device according to the second identifier.

After sending the deactivation information according to the second identifier, the network device pauses sending the PDSCH to the terminal device by multicast/broadcast according to the semi-persistent configuration information. Accordingly, after receiving the deactivation information from the network device, the terminal devices pauses receiving the PDSCH from the network device according to the semi-persistent configuration information. The second identifier is the first-type identifier or the second-type identifier.

Therefore, in this embodiment, multicast/broadcast service data can be scheduled flexibly through the activation information and the deactivation information, and air interface signaling can be reduced at the same time.

In one embodiment, the method of this embodiment further includes:

S206: the terminal devices deactivate the semi-persistent configuration information according to the deactivation information, and/or determine, according to the deactivation information, that a multicast/broadcast communication mode of the terminal devices is switched from a point to multi-point (PTM) communication mode to a point to point (PTP) communication mode.

After receiving the deactivation information from the network device, the terminal devices deactivate the semi-persistent configuration information according to the deactivation information. For example, whether the semi-persistent configuration information is deactivated is indicated by a flag bit. After receiving the deactivation information, the terminal device changes the flag bit to a value indicating the semi-persistent configuration information is deactivated. And/or, after receiving the deactivation information from the network device, the terminal devices determine, according to the deactivation information, that the multicast/broadcast communication mode of the terminal devices is switched from the PTM communication mode to the PTP communication mode.

In one embodiment, after sending the deactivation information, the network device may send multicast/broadcast service data to the terminal device through the PTP communication mode. Accordingly, after receiving the deactivation information, the terminal device may receive the multicast/broadcast service data from the network device through the PTP communication mode.

Therefore, in this embodiment, indication of switching of the multicast/broadcast communication mode can be supported through the deactivation information.

In one embodiment, the deactivation information includes field information for indicating deactivating the semi-persistent configuration information.

In one embodiment, the deactivation information is downlink control information in a preset format. For example, the deactivation information indicates whether to deactivate the semi-persistent configuration information through a field of format indication of the downlink control information. For example, the field of format indication is "0" or "1" to indicate that the downlink control information is the deactivation information.

On the basis of the embodiment shown in FIG. 3, in a possible implementation of the above S205, the second identifier is the second-type identifier, and the network device sends deactivation information to the terminal device group according to the second-type identifier. Accordingly, each terminal device in the terminal device group receives the deactivation information from the network device according to the second-type identifier. In this implementation, the deactivation information received by each terminal device is obtained by scrambling using the second-type identifier (such as the GCS-RNTI) in the semi-static configuration information. Indication information for indicating scrambling the deactivation information using the second-type identifier is further included in the above semi-static configuration.

In one embodiment, the deactivation information in this implementation further indicates switching all the terminal devices belonging to the terminal device group from the point to multi-point communication mode to the point to point communication mode.

Therefore, the network device can indicate, to multiple terminal devices, deactivating the semi-persistent configuration information by sending the same deactivation information, which reduces scheduling signaling resources and saves air interface resources.

In the implementation where the deactivation information is obtained by scrambling using the second-type identifier (such as the GCS-RNTI), the terminal device feeds second reception confirmation information back to the network device, which includes the following optional examples. The second reception confirmation information is used to indicate whether the deactivation information is received successfully. If the second reception confirmation information indicates that the deactivation information is not received successfully, the network device may retransmit the deactivation information to ensure that the terminal device receives the deactivation information.

In a possible example, if the activation information is scrambled using the first-type identifier (such as the CS-RNTI), the following two possible implementations are included.

In a possible implementation, the activation information received by the terminal device includes PUCCH resource indication information and timing information. Correspondingly, after receiving the activation information, the terminal device determines PUCCH resource information of the second reception confirmation information according to the PUCCH resource indication information of the activation information. For example, the semi-persistent configuration information includes total PUCCH resource information related to the terminal device. The terminal device determines a PUCCH resource indicated by the PUCCH resource indication information from the total PUCCH resource information, and takes the determined PUCCH resource as the PUCCH resource information of the second reception confirmation information. The terminal device further determines timing information of the second reception confirmation information according to the timing information of the activation information, such as taking the timing information of the activation information as the timing information of the second reception confirmation information. Then the terminal device sends the second reception confirmation information to the network device according to the determined PUCCH resource and timing information of the second reception confirmation information.

Accordingly, for each terminal device, the network device determines the PUCCH resource information of the second reception confirmation information according to the PUCCH resource indication information of the activation information; determines the timing information of the second reception confirmation information according to the timing information of the activation information; and then receives the second reception confirmation information from the terminal device according to the PUCCH resource information and the timing information of the second reception confirmation information.

In another possible implementation, the related information of the PDSCH in the semi-persistent configuration information of the terminal device includes: PUCCH resource information corresponding to the PDSCH, and the activation information includes timing information. Correspondingly, after receiving the activation information, the terminal device determines PUCCH resource information of the second reception confirmation information according to the PUCCH resource information corresponding to the PDSCH in the semi-persistent configuration information. For example, the PUCCH resource information corresponding to the PDSCH in the semi-persistent configuration information is determined as the PUCCH resource information of the second reception confirmation information. The terminal device further determines timing information of the second reception confirmation information according to the timing information of the activation information, such as taking the timing information of the activation information as the timing information of the second reception confirmation information. Then the terminal device sends the second reception confirmation information to the network device according to the determined PUCCH resource and timing information of the second reception confirmation information.

Accordingly, for each terminal device, the network device determines the PUCCH resource information of the second reception confirmation information according to the PUCCH resource information corresponding to the PDSCH in the semi-persistent configuration information; determines the timing information of the second reception confirmation information according to the timing information of the activation information; and then receives the second reception confirmation information from the terminal device according to the PUCCH resource information and the timing information of the second reception confirmation information.

In a possible example, the deactivation information obtained by scrambling using the second-type identifier is further used to indicate that reception confirmation information indicating whether the deactivation information is received successfully is not required to be fed back. Accordingly, the terminal device does not send the reception confirmation information indicating whether the deactivation information is received successfully to the network device. In one embodiment, the network device may send the deactivation information to the terminal devices for multiple consecutive times according to the second-type identifier to ensure that the terminal devices can receive the deactivation information.

In a possible example, if the network device pre-configures a feedback resource of the reception confirmation information for each terminal device, the terminal device may feed the reception confirmation information indicating whether the deactivation information (scrambled using the second-type identifier) is received successfully back according to the pre-configured feedback resource and the PUCCH resource indication information and timing information of the activation information. For the specific implementation process, the implementation process of feeding the first reception confirmation information back according to the pre-configured feedback resource and the PUCCH resource indication information and timing information of the activation information when the activation information is obtained by scrambling using the second-type identifier in the above embodiments can be referred to and will not be repeated here.

On the basis of the embodiment shown in FIG. 3, in another possible implementation of the above S205, the second identifier is the first-type identifier, such as the CS-RNTI. The network device sends the deactivation information to the terminal devices according to the first-type identifiers of the terminal devices, respectively. Accordingly, each terminal device receives the deactivation information from the network device according to the first-type identifier of the terminal device. In this implementation, the deactivation information received by the terminal device is obtained by scrambling using the first-type identifier of the terminal device (such as the CS-RNTI of the terminal device). Indication information for indicating scrambling the deactivation information using the first-type identifier is further included in the above semi-static configuration.

In one embodiment, the deactivation information in this implementation further indicates switching a terminal device receiving the deactivation information from the point to multi-point communication mode to the point to point communication mode.

In this embodiment, the network device sends the deactivation information to each terminal device respectively, and related information about the terminal device can be added to the deactivation information, which can increase information carried in the deactivation information, increase the flexibility of scheduling of air interface resource, and improve the user experience.

In the implementation where the deactivation information is obtained by scrambling using the first-type identifier (such as the CS-RNTI) of the terminal device, the terminal device sends the second reception confirmation information to the network device, which includes the following possible implementations. The second reception confirmation information is used to indicate whether the deactivation information is received successfully.

In a possible implementation, the deactivation information received by the terminal device includes PUCCH resource indication information and timing information. Correspondingly, after receiving the deactivation information, the terminal device determines PUCCH resource information of the second reception confirmation information according to the PUCCH resource indication information of the deactivation information. For example, the semi-persistent configuration information includes total PUCCH resource information related to the terminal device. The terminal device determines a PUCCH resource indicated by the PUCCH resource indication information from the total PUCCH resource information, and takes the determined PUCCH resource as the PUCCH resource information of the second reception confirmation information. The terminal device further determines timing information of the second reception confirmation information according to the timing information of the deactivation information, such as taking the timing information of the deactivation information as the timing information of the second reception confirmation information. Then the terminal device sends the second reception confirmation information to the network device according to the determined PUCCH resource and timing information of the second reception confirmation information.

Accordingly, for each terminal device, the network device determines the PUCCH resource information of the second reception confirmation information according to the PUCCH resource indication information of the deactivation information; determines the timing information of the second reception confirmation information according to the timing information of the deactivation information; and then receives the second reception confirmation information from the terminal device according to the PUCCH resource information and the timing information of the second reception confirmation information.

In another possible implementation, the related information of the PDSCH in the semi-persistent configuration information of the terminal device includes: PUCCH resource information corresponding to the PDSCH, and the deactivation information includes timing information. Correspondingly, after receiving the deactivation information, the terminal device determines PUCCH resource information of the second reception confirmation information according to the PUCCH resource information corresponding to the PDSCH in the semi-persistent configuration information. For example, the PUCCH resource information corresponding to the PDSCH in the semi-persistent configuration information is determined as the PUCCH resource information of the second reception confirmation information. The terminal device further determines timing information of the second reception confirmation information according to the timing information of the deactivation information, such as taking the timing information of the deactivation information as the timing information of the second reception confirmation information. Then the terminal device sends the second reception confirmation information to the network device according to the determined PUCCH resource and timing information of the second reception confirmation information.

Accordingly, for each terminal device, the network device determines the PUCCH resource information of the second reception confirmation information according to the PUCCH resource information corresponding to the PDSCH in the semi-persistent configuration information; determines the timing information of the second reception confirmation information according to the timing information of the deactivation information; and then receives the second reception confirmation information from the terminal device according to the PUCCH resource information and the timing information of the second reception confirmation information.

Therefore, in this embodiment, how to feed the second reception confirmation information of the deactivation information back to the network device is determined by means of the deactivation information, to reduce signaling consumption, saving air interface resources and ensuring that each terminal device receives the deactivation information.

The present application is described below in several specific embodiments, where the network device is a base station, the terminal device is a UE, the first-type identifier is a CS-RNTI, and the second-type identifier is a GCS-RNTI, as an example.

In a first implementation, the base station uses the CS-RNTI to scramble activation information and uses the GCS-RNTI to scramble deactivation information. In one embodiment, the following steps are included.

Step 1.1: the base station configures, for UEs belonging to a UE group for a multicast/broadcast service, parameters of semi-persistent scheduling for sending the MBS, which includes the following four items:

configure an RNTI used to activate an SPS PDSCH for the MBS as a CS-RNTI;
configure an RNTI used to deactivate the SPS PDSCH as a GCS-RNTI;
configure an RNTI for SPS PDSCH scrambling as a G-RNTI;
configure an SPS PDSCH association index value as an SPS-ID.

The CS-RNTI is an RNTI based on the UE (ue specific), that is, different UEs have different CS-RNTI values, and the base station distinguishes the UEs by scheduling different CS-RNTIs. A use of the CS-RNTI includes at least one of the following:

a use for activating the SPS PDSCH for the MBS;
a use for switching from the PTM communication mode to the PTP communication mode based on the UE;
a use for retransmitting the SPS PDSCH for the MBS.

The G-RNTI is an RNTI for the MBS, and each service may correspond to one G-RNTI or multiple G-RNTIs. A value of the G-RNTI is used for a scrambling parameter of the service data PDSCH, and multiple UEs within the same UE group use the same configured value.

The GCS-RNTI here is an RNTI for the MBS, and each service may correspond to one GCS-RNTI or multiple GCS-RNTIs. A use of the GCS-RNTI includes at least one of the following:

a use for deactivation indication of SPS PDSCH for MBS, or a use for switching from PTM communication mode to PTP communication mode for all UEs belonging to a same UE group.

The SPS PDSCH association index value (SPS-ID) here is used to indicate a configuration number of a corresponding MBS (multicast/broadcast service) SPS PDSCH, and is to distinguish SPS PDSCHs when the base station configures multiple SPS PDSCHs (including unicast and broadcast multicast).

Step 1.2: the base station configures SPS PDSCH information for the MBS to the UEs.

Configure a transmission period of SPS: parameter p, a period unit may be millisecond (ms) or time slot.

Configure total resources of a HARQ-ACK feedback channel.

Configure a number of a HARQ-ACK feedback channel resource (PUCCH ID).

The related information of the PDSCH involved in the above embodiments may include the SPS-ID, the transmission period of the SPS, the total resources of the HARQ-ACK feedback channel, and the number of the HARQ-ACK feedback channel resource.

Step 1.3: for each UE, the base station scrambles a physical downlink control channel (PDCCH) using the CS-RNTI of the UE and sends it to the corresponding UE, where the PDCCH carries the activation information.

Step 1.4: the UE receives the PDCCH scrambled by the CS-RNTI and activate the MBS SPS PDSCH.

Meanings of fields in DCI carried by the PDCCH is shown in Table 1.

received by the UE meet set values (as shown in Table 2), the DCI is considered as the activation information, and it is considered to activate SPS PDSCH transmission of the SPS-ID configured as follows.

TABLE 2

| Field in DCI | Set value |
| --- | --- |
| Redundancy version number (Redundancy version) | All 0 |
| New transmission data indication (new data indication, NDI) | 0 |
| HARQ process number (HARQ process ID) | Configured SPS-ID |

When receiving the above activation information, the UE receives the PDSCH scheduled by the activation information at the same time, and a scrambling code of the relevant PDSCH uses the G-RNTI as a scrambling code sequence. The relevant description in the above Formula 1 and Formula 2 can be referred to for details, which will not be repeated here.

There is no corresponding control channel for sending and receiving the SPS PDSCH after activation, and an indication mode of a HARQ-ACK feedback channel PUCCH corresponding to the SPS PDSCH may include the following two modes.

A First Mode:

A value of a PUCCH resource indicator (PUCCH resource indicator) of HARQ-ACK feedback for the SPS PDSCH without control signaling adopts a PUCCH resource

TABLE 1

| Information field serial number | Name | Number of Bits | Meaning |
| --- | --- | --- | --- |
| 1 | DCI formats indicator (DCI formats) | 1 | Indicate downlink |
| 2 | Frequency domain resource assignment indicator (Frequency domain resource assignment) | Nb | Used to indicate a bandwidth and a position of a scheduled PDSCH in a frequency domain, and an occupied bit width is related to a total schedulable maximum bandwidth |
| 3 | Time domain resource assignment indicator (Time domain resource assignment) | 4 | An indicator used to indicate a time domain of PDSCH scheduling |
| 4 | Physical resource mapping mode (VRB-to-PRB mapping) | 1 | Interleaving or non-interleaving indicator |
| 5 | Modulation coding scheme (Modulation and coding scheme) | 5 | Used to indicate a modulation order and a channel coding rate adopted for the PDSCH |
| 6 | Redundancy coding version (Redundancy version) | 2 | A redundancy version number of data transmission, used for channel decoding and demodulation |
| 7 | New data indication (NDI) | 1 | Represent activating or deactivating the SPS PDSCH |
| 8 | Downlink assignment index | 2 | Downlink scheduling counter |
| 9 | PUCCH power control parameter (TPC command for scheduled PUCCH) | 2 | Represent a power control parameter for the UE to send an uplink channel PUCCH |
| 10 | HARQ process number | 4 | Used to identify a HARQ process |
| 11 | PUCCH resource indicator | 3 | Indicate a PUCCH resource for feeding HARQ-ACK back for this DCI command |
| 12 | HARQ feedback timing indicator (PDSCH-to-HARQ_feedback timing indicator) | 3 | Indicate information for indicating HARQ feedback timing of feedback HARQ-ACK for this DCI command and a candidate SPS PDSCH |

When the following two fields (Redundancy version number and New transmission data indication) of the DCI indicator of HARQ-ACK feedback included in the activation information scrambled by the CS-RNTI.

A value of timing information of HARQ-ACK feedback for the SPS PDSCH (PDSCH-to-HARQ_feedback timing indicator) without control signaling adopts a HARQ-ACK feedback timing indicator (PDSCH-to-HARQ_feedback timing indicator) included in the activation information scrambled by the CS-RNTI.

A Second Mode:

A value of a PUCCH resource indicator of HARQ-ACK feedback for the SPS PDSCH without control signaling adopts a PUCCH resource formulated when the base station pre-configures SPS PDSCH parameters for the UE.

A value of timing information of HARQ-ACK feedback for the SPS PDSCH (PDSCH-to-HARQ_feedback timing indicator) without control signaling adopts a HARQ-ACK feedback timing indicator (PDSCH-to-HARQ_feedback timing indicator) included in the activation information scrambled by the CS-RNTI.

Step 1.5: the base station scrambles a PDCCH using the GCS-RNTI and sends it to the UE, where the PDCCH carries the deactivation information.

Step 1.6: the UE deactivates the MBS SPS PDSCH after receiving the above PDCCH scrambled by the GCS-RNTI.

Fields in DCI carried by the PDCCH are as shown in Table 1.

When the following four fields (redundancy version number, new transmission data indication, frequency domain resource assignment indicator, modulation and coding scheme) of the DCI received by the UE meet set values (as shown in Table 3), the DCI is considered as the deactivation information, and it is considered to deactivate the SPS PDSCH transmission of the SPS-ID configured as follows, and/or it is considered to switch the transmission mode of the SPS PDSCH of the SPS-ID configured as follows from PTM to PTP (and all UEs within the UE group corresponding to the GCS-RNTI are switched from PTM to PTP).

When determining whether the DCI is the deactivation information, the UE adds determining of the frequency domain resource assignment indicator and the modulation and coding scheme on the basis of determining the redundant version number and the new transmission data indication. In one embodiment, values of the modulation and coding scheme are all 1, and the frequency domain resource assignment indicator is all 0, to represent the deactivation information.

TABLE 3

| Field in DCI | Set value |
| --- | --- |
| Redundancy version number (Redundancy version) | All 0 |
| New transmission data indication (NDI, new data indication) | 0 |
| HARQ process number (HARQ process ID) | Configured SPS-ID |
| Frequency domain resource assignment indicator (Frequency domain resource assignment) | All 1 |
| Modulation coding scheme (Modulation and coding scheme) | All 1 |

In one embodiment, considering that the GCS-RNTI scrambles the DCI, the "DCI formats indicator (DCI formats)" field may also be used to indicate whether the DCI is the deactivation information. For example, setting a value of the "DCI formats indicator (DCI formats)" field to "0" or "1" can indicate that the DCI is the deactivation information.

In one embodiment, in a possible implementation, the UE may not feed HARQ-ACK of the deactivation information back to the base station after receiving the deactivation information scrambled by the GCS-RNTI. In one embodiment, the PUCCH resource indication field and HARQ feedback timing indication field included in the deactivation information scrambled by the GCS-RNTI are invalid. Or, the PUCCH resource indication field and the HARQ feedback timing indication field included in the deactivation information scrambled by the GCS-RNTI do not carry any information.

In another possible implementation, the UE may feed the HARQ-ACK of the deactivation information back to the base station after receiving the deactivation information scrambled by the GCS-RNTI, and the PUCCH resource indicator and the timing information (PDSCH-to-HARQ-_feedback timing indicator) of the HARQ-ACK include the following two implementations.

A First Mode:

A value of a PUCCH resource indicator of HARQ-ACK feedback for the deactivation information adopts a PUCCH resource indicator of HARQ-ACK feedback included in the activation information (obtained by scrambling using the CS-RNTI).

A value of a timing indicator of HARQ-ACK feedback (PDSCH-to-HARQ_feedback timing indicator) for the deactivation information adopts a HARQ-ACK feedback timing indicator (PDSCH-to-HARQ_feedback timing indicator) included in the activation information.

A Second Mode:

A value of a PUCCH resource indicator of HARQ-ACK feedback for the deactivation information adopts a PUCCH resource formulated when the base station pre-configures SPS PDSCH parameters for the UE.

A value of timing information of HARQ-ACK feedback (PDSCH-to-HARQ_feedback timing indicator) for the deactivation information adopts a HARQ-ACK feedback timing indicator (PDSCH-to-HARQ_feedback timing indicator) included in the activation information (obtained by scrambling using the CS-RNTI).

It should be noted that a sequence of steps 1.1 to 1.6 in this implementation may not be limited to the sequence shown above.

In this implementation, the CS-RNTI is used to scramble the activation information, the GCS-RNTI is used to scramble the deactivation information, and the deactivation information scrambled using the GCS-RNTI can support switching of all UEs in the UE group from PTM to PTP. The activation information can be based on information indicating a HARQ feedback channel PUCCH of the SPS PDSCH, which can solve a problem of indication of the HARQ-ACK feedback channel for multicast/broadcast by using the prior art, reduce a modification amount of a protocol, and reduce complexity of the UE and base station device. Furthermore, the deactivation information is the DCI scrambled using the G-RNTI, which can be implemented by a single signaling, thus reducing consumption of scheduling signaling and saving air interface resources.

In a second implementation, the base station uses the CS-RNTI to scramble the activation information and uses the CS-RNTI to scramble the deactivation information. In one embodiment, the following steps are included.

Step 2.1: the base station configures, for UEs belonging to a UE group for MBS, parameters of semi-persistent scheduling for the MBS, which includes the following three items:

configure an RNTI used to activate and deactivate an SPS PDSCH for the MBS as a CS-RNTI;

configure an RNTI for SPS PDSCH scrambling as a G-RNTI.

configure an SPS PDSCH association index value as an SPS-ID.

The CS-RNTI is an RNTI based on the UE (ue specific), that is, different UEs have different CS-RNTI values, and the base station distinguishes the UEs by scheduling different CS-RNTIs. A use of the CS-RNTI includes at least one of the following:

a use for activating the SPS PDSCH for the MBS;
    a use for deactivating the SPS PDSCH for the MBS;
    a use for retransmitting the SPS PDSCH for the MBS.

The G-RNTI is an RNTI for the MBS, and each service may correspond to one G-RNTI or multiple G-RNTIs. A value of the G-RNTI is used for dynamic scheduling of the MBS, and used for a scrambling parameter of the service data PDSCH. Multiple UEs within the same UE group use the same configured value.

The SPS PDSCH association index value (SPS-ID) here is used to indicate a configuration number of a corresponding MBS SPS PDSCH, and is to distinguish SPS PDSCHs when the base station configures multiple SPS PDSCHs.

Step 2.2: the base station configures SPS PDSCH information for the MBS to the UEs.

Configure a transmission period of SPS: parameter p, a period unit may be millisecond (ms) or time slot.

Configure total resources of a HARQ-ACK feedback channel.

Configure a number of a HARQ-ACK feedback channel resource (PUCCH ID).

Step 2.3: for each UE, the base station scrambles a PDCCH using the CS-RNTI of the UE and sends it to the corresponding UE, where the PDCCH carries the activation information.

Step 2.4: the UE receives a PDCCH scrambled by the CS-RNTI and activate the MBS SPS PDSCH.

Relevant description of steps 1.3 and 1.4 in the first implementation can be referred to for relevant description of steps 2.3 and 2.4, which will not be repeated here.

Step 2.5: the base station scrambles a PDCCH using the CS-RNTI of each UE, and sends it to the corresponding UE, where the PDCCH carries the deactivation information.

Step 2.6: the UE deactivates the MBS SPS PDSCH after receiving the PDCCH scrambled by the CS-RNTI of the UE.

Relevant description of step 1.6 in the first implementation can be referred to for how the UE determines that the received DCI is the deactivation information, which will not be repeated here.

In this implementation, the deactivation information is obtained by scrambling using the CS-RNTI, and the PUCCH resource indication field and the HARQ feedback timing indication field in the deactivation information are valid fields. After receiving the deactivation information scrambled using the CS-RNTI, the UE may feed HARQ-ACK for the deactivation information back to the base station, and the PUCCH resource indicator and the timing information (PDSCH-to-HARQ_feedback timing indicator) of the HARQ-ACK include the following two implementations.

A first mode;

A value of a PUCCH resource indicator of HARQ-ACK feedback for the deactivation information adopts a PUCCH resource indicator of HARQ-ACK feedback included in the deactivation information.

A value of a timing indicator of HARQ-ACK feedback (PDSCH-to-HARQ_feedback timing indicator) for the deactivation information adopts a HARQ-ACK feedback timing indicator (PDSCH-to-HARQ_feedback timing indicator) included in the activation information.

A Second Mode:

A value of a PUCCH resource indicator of HARQ-ACK feedback for the deactivation information adopts a PUCCH resource formulated when the base station pre-configures SPS PDSCH parameter for the UE.

A value of timing information of HARQ-ACK feedback (PDSCH-to-HARQ_feedback timing indicator) for the deactivation information adopts a HARQ-ACK feedback timing indicator (PDSCH-to-HARQ_feedback timing indicator) included in the deactivation information.

It should be noted that a sequence of steps 2.1 to 2.6 in this implementation may not be limited to the sequence shown above.

In this implementation, the CS-RNTI is used to scramble the activation information and the CS-RNTI is used to scramble the deactivation information. For the activation information and deactivation information, reference is made to an existing process, which reduces a modification amount of a protocol, and reduces complexity of the UE and base station device.

In a third implementation, the base station uses the GCS-RNTI to scramble the activation information and uses the GCS-RNTI to scramble the deactivation information. In one embodiment, the following steps are included:

Step 3.1: the base station configures, for UEs belonging to a UE group for MBS, parameters of semi-persistent scheduling for the MBS, which includes the following three items:

configure an RNTI used to activate and deactivate an SPS PDSCH for the MBS as a CS-RNTI;
    configure an RNTI for SPS PDSCH scrambling as a G-RNTI;
    configure an SPS PDSCH association index value as an SPS-ID.

The CS-RNTI is an RNTI based on the UE (ue specific), that is, different UEs have different CS-RNTI values, and the base station distinguishes the UEs by scheduling different CS-RNTIs. A use of the CS-RNTI includes at least one of the following:

a use for activating the SPS PDSCH for the MBS;
    a use for switching from the PTM communication mode to the PTP communication mode based on the UE;
    a use for retransmitting the SPS PDSCH for the MBS.

The G-RNTI is an RNTI for the MBS, and each service may correspond to one G-RNTI or multiple G-RNTIs. A value of the G-RNTI is used for dynamic scheduling of the MBS, and used for a scrambling parameter of the service data PDSCH. Multiple UEs within the same UE group use the same configured value.

The GCS-RNTI here is an RNTI of the UE group for the MBS. The UEs in the same UE group or receiving the same MBS have the same GCS-RNTI value. A use of the GCS-RNTI includes at least one of the following:

a use for activating the SPS PDSCH for the MBS;
    a use for deactivating the SPS PDSCH for the MBS;
    a use for retransmitting the SPS PDSCH for the MBS.

The SPS PDSCH association index value (SPS-ID) here is used to indicate a configuration number of a corresponding MBS SPS PDSCH, and is to distinguish SPS PDSCHs when the base station configures multiple SPS PDSCHs.

Step 3.2: the base station configures SPS PDSCH information for the MBS to the UEs.

Configure a transmission period of SPS: parameter p, a period unit may be millisecond (ms) or time slot.

Configure total resources of a HARQ-ACK feedback channel.

Configure a number of a HARQ-ACK feedback channel resource (PUCCH ID).

Step 3.3: the base station scrambles a PDCCH using the GCS-RNTI and send it to the UEs, where the PDCCH carries the activation information.

Step 3.4: the UEs receive the PDCCH scrambled by the GCS-RNTI and activate the MBS SPS PDSCH.

Relevant description of step 1.4 in the first implementation can be referred to for how the UE determines that the received DCI is the activation information, which will not be repeated here.

In one embodiment, in order to reduce the power consumption caused by blind detection of the control channel by the UE, information indication may be added to the DCI which is the deactivation information to indicate that the UE does not need to detect the deactivation information within an allotted time, or to indicate that the UE detects the deactivation information at a specific PDCCH detection opportunity. An effect of power saving of the UE is achieved.

In one embodiment, the HARQ feedback for the MBS SPS PDSCH may be divided into the following cases.

Case 1: if RRC does not configure the HARQ-ACK feedback resource for the UE or the HARQ feedback configured by RRC is "off", the UE does not need to feed HARQ-ACK information back, and indication bit information (including PUCCH resource indication, HARQ feedback timing indication) of HARQ-ACK in the DCI may be used to indicate that DCI detection is not required.

Case 2: if RRC configures the HARQ-ACK feedback resource, the UE may feed HARQ-ACK information back according to bit information (including PUCCH resource indication, HARQ feedback timing indication) in RRC configuration and in the DCI.

In case 2, the base station configures the following N PUCCH resources to the UE through a higher-layer message, which mainly include the following:

a PUCCH format, a starting RB position, a starting symbol and a symbol length, the number of initial cyclic shift, the number of orthogonal sequences, a UE feedback index.

The description in the above related embodiments can be referred to for how to calculate and obtain the PUCCH channel number based on the above, which will not be repeated here.

Step 3.5: the base station scrambles a PDCCH using the GCS-RNTI and send it to the UEs, where the PDCCH carries the deactivation information.

Step 3.6: the UEs deactivate the MBS SPS PDSCH after receiving the PDCCH scrambled by the GCS-RNTI.

Relevant description of steps 1.5 and 1.6 can be referred to for steps 3.5 and 3.6, which will not be repeated here.

It should be noted that a sequence of steps 3.1 to 3.6 in this implementation may not be limited to the sequence shown above.

In this implementation, the GCS-RNTI is used to scramble the activation information, the GCS-RNTI is used to scramble the deactivation information, and the detection-free indication is supported. The activation information and the deactivation information are the DCI scrambled using the GCS-RNTI, which can be implemented by a single signaling, to reduce consumption of scheduling signaling and saving air interface resources.

Figure 4:
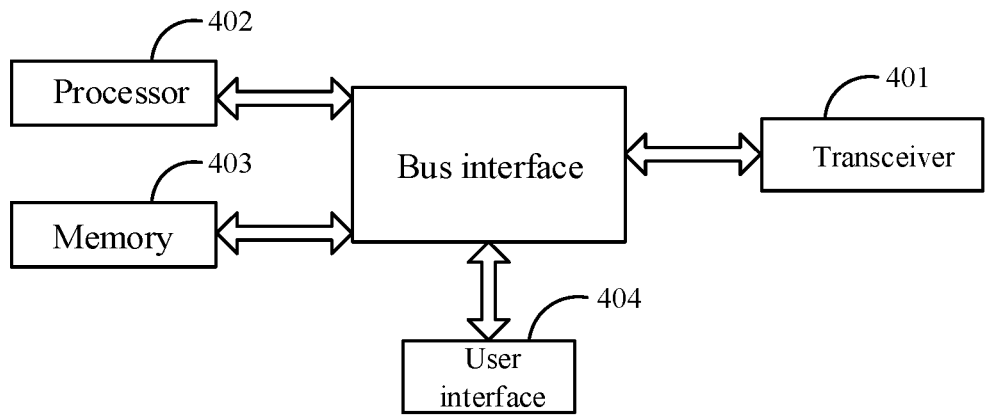
FIG. 4 is a schematic structural diagram of a semi-persistent scheduling apparatus for a multicast/broadcast service provided by an embodiment of the present application.

On the terminal side, an embodiment of the present application provides a semi-persistent scheduling apparatus for a multicast/broadcast service. As shown in FIG. 4, the semi-persistent scheduling apparatus for a multicast/broadcast service in this embodiment may be a terminal device, and the semi-persistent scheduling apparatus for a multicast/broadcast service may include a transceiver 401, a processor 402 and a memory 403.

The transceiver 401 is configured to receive and send data under control of the processor 402.

In FIG. 4, a bus architecture may include any number of interconnected buses and bridges, and various circuits of one or more processors represented by the processor 402 and a memory represented by the memory 403 are linked together. The bus architecture may also link various other circuits, such as a peripheral device, a voltage regulator, a power management circuit and the like, which are well known in the art, and thus not be further described here. A bus interface provides an interface. The transceiver 401 may be multiple elements, including a transmitter and a receiver, and provide a device for communication with various other apparatuses on transmission media. These transmission media include a wireless channel, a wired channel, an optical cable and other transmission media. In one embodiment, the semi-persistent scheduling apparatus for a multicast/broadcast service may further include a user interface 404. For different user equipments, the user interface 404 may also be an interface that can externally and internally connect required devices, and the connected devices include, but are not limited to, a small keypad, a display, a speaker, a microphone, a joystick, etc.

The processor 402 is responsible for managing the bus architecture and general processing, and the memory 403 can store data used by the processor 402 when executing operations.

In one embodiment, the processor 402 may be a central processing unit (CPU), an application specific integrated circuit (ASIC), a field-programmable gate array (FPGA), or a complex programmable logic device (CPLD), and the processor may also adopt a multi-core architecture.

By calling a computer program stored in the memory 403, the processor 402 is configured to execute any of the methods related to the terminal device provided by the embodiments of the present application in accordance with obtained executable instructions. The processor and the memory may also be physically separated.

In one embodiment, the processor 402 is configured to execute the following operations:

receiving semi-persistent configuration information for a multicast/broadcast service from a network device, where the semi-persistent configuration information includes a first identifier and related information of a PDSCH for multicast/broadcast service transmission;

receiving activation information from the network device according to the first identifier, where the activation information is used to indicate activating the semi-persistent configuration information, and the first identifier is a first-type identifier or a second-type identifier, where the first-type identifier is used to identify a terminal device, and the second-type identifier is used to identify a terminal device group of a multicast/broadcast service which a terminal device belongs to;

receiving the PDSCH from the network device according to the activation information and the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the processor 402 further executes the following operations:
before receiving the PDSCH from the network device, activating the semi-persistent configuration information according to the activation information.

In one embodiment, the processor 402 further executes the following operations:
after receiving the PDSCH from the network device according to the activation information and the semi-persistent configuration information, sending first reception confirmation information to the network device, where the first reception confirmation information is used to indicate whether the PDSCH is received successfully.

In one embodiment, the first identifier is the first-type identifier, and the activation information includes PUCCH resource indication information and timing information;
sending the first reception confirmation information to the network device includes:
determining PUCCH resource information of the first reception confirmation information according to the PUCCH resource indication information of the activation information;
determining timing information of the first reception confirmation information according to the timing information of the activation information;
sending the first reception confirmation information to the network device according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;
the processor 402 further executes the following operations:
receiving the deactivation information from the network device according to the second identifier, where the deactivation information is used to indicate deactivating the semi-persistent configuration information;
where the second identifier is the first-type identifier or the second-type identifier.

In one embodiment, the processor 402 further executes the following operations:
deactivating the semi-persistent configuration information according to the deactivation information; and/or,
determining, according to the deactivation information, that a multicast/broadcast communication mode of the terminal device is switched from a point to multi-point communication mode to a point to point communication mode.

In one embodiment, if the second identifier is the first-type identifier, the deactivation information further indicates switching a terminal device receiving the deactivation information from a point to multi-point communication mode to a point to point communication mode;
if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, if the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;
the processor 402 further executes the following operations:
after receiving the deactivation information from the network device according to the second identifier, determining PUCCH resource information of second reception confirmation information according to the PUCCH resource information corresponding to the PDSCH;
determining timing information of the second reception confirmation information according to the timing information of the activation information;
sending the second reception confirmation information to the network device according to the PUCCH resource information and the timing information of the second reception confirmation information, where the second reception confirmation information is used to indicate whether the deactivation information is received successfully.

In one embodiment, the first identifier is obtained by scrambling the first-type identifier, and the activation information includes PUCCH resource indication information and timing information;
the processor 402 further executes the following operations:
after receiving the deactivation information from the network device according to the second identifier, determining PUCCH resource information of second reception confirmation information according to the PUCCH resource indication information of the activation information;
determining timing information of the second reception confirmation information according to the timing information of the activation information;
sending the second reception confirmation information to the network device according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

It should be noted here that the above apparatus provided by the present application can implement all the method steps implemented by the terminal device in the above method embodiments, and can achieve the same technical effects. The part of this embodiment which is same as the method embodiments and the beneficial effects will not be described in detail here.

Figure 5:
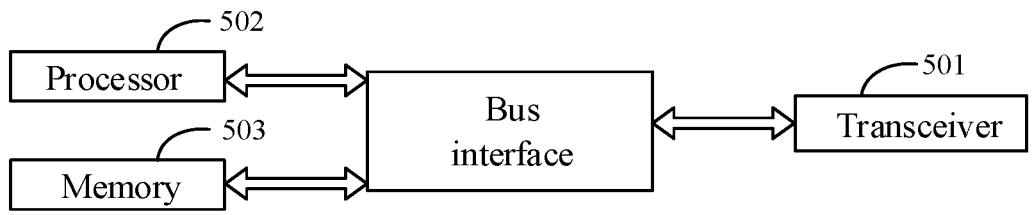
FIG. 5 is a schematic structural diagram of a semi-persistent scheduling apparatus for a multicast/broadcast service provided by another embodiment of the present application.

On the network side, an embodiment of the present application provides a semi-persistent scheduling apparatus for a multicast/broadcast service. As shown in FIG. 5, the semi-persistent scheduling apparatus for a multicast/broadcast service in this embodiment may be a network device, and the semi-persistent scheduling apparatus for a multicast/broadcast service may include a transceiver 501, a processor 502 and a memory 503.

The transceiver 501 is configured to receive and send data under control of the processor 502.

In FIG. 5, a bus architecture may include any number of interconnected buses and bridges, and various circuits of one or more processors represented by the processor 502 and a memory represented by the memory 503 are linked together. The bus architecture may also link various other circuits, such as a peripheral device, a voltage regulator, a power management circuit and the like, which are well known in the art, and thus not be further described here. A bus interface provides an interface. The transceiver 501 may be multiple elements, including a transmitter and a receiver, and provide a device for communication with various other apparatuses on transmission media. These transmission media include a wireless channel, a wired channel, an optical cable and other transmission media. The processor 502 is responsible for managing the bus architecture and general processing, and the memory 503 can store data used by the processor 502 when executing operations.

The processor 502 may be a CPU, an ASIC, a FPGA or a CPLD, and the processor may also adopt a multi-core architecture.

By calling a computer program stored in the memory 503, the processor 502 is configured to execute any of the methods related to the network device provided by the embodiments of the present application in accordance with obtained executable instructions. The processor and the memory may also be physically separated.

In one embodiment, the processor 502 is configured to execute the following operations:
  sending semi-persistent configuration information for a multicast/broadcast service to N terminal devices, where the N terminal devices belong to a same terminal device group for the multicast/broadcast service, and N is an integer greater than or equal to 1, and where semi-persistent configuration information of each terminal device includes a first identifier and related information of a PDSCH for multicast/broadcast service transmission;
  sending activation information to the N terminal devices according to the first identifier, where the first identifier is a first-type identifier or a second-type identifier, the first-type identifier is used to identify a terminal device, and the second-type identifier is used to identify a terminal device group of a multicast/broadcast service which a terminal device belongs to, and where the activation information is used to indicate activating the semi-persistent configuration information;
  sending the PDSCH to the N terminal devices by multicast/broadcast according to the semi-persistent configuration information, where the PDSCH carries multicast/broadcast service data.

In one embodiment, a scrambling sequence of the PDSCH is obtained according to the second-type identifier, or,
  the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the processor 502 further executes the following operations:
  after sending the PDSCH to the N terminal devices by multicast/broadcast, receiving first reception confirmation information from the N terminal devices respectively, where the first reception confirmation information is used to indicate whether the PDSCH is received successfully.

In one embodiment, the first identifier is the first-type identifier, and the activation information includes PUCCH resource indication information and timing information;
  receiving the first reception confirmation information from the N terminal devices includes:
  determining PUCCH resource information of the first reception confirmation information according to the PUCCH resource indication information of the activation information;
  determining timing information of the first reception confirmation information according to the timing information of the activation information;
  receiving the first reception confirmation information from the terminal devices according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;
  the processor 502 further executes the following operations:
  sending the deactivation information to the N terminal devices according to the second identifier, where the deactivation information is used to indicate deactivating the semi-persistent configuration information;
  where the second identifier is the first-type identifier or the second-type identifier.

In one embodiment, the deactivation information is further used to indicate switching a multicast/broadcast communication mode of a terminal device from a point to multi-point communication mode to a point to point communication mode.

In one embodiment, if the deactivation information is obtained by scrambling according to the second-type identifier, the deactivation information further indicates switching terminal devices belonging to the terminal device group from a point to multi-point communication mode to a point to point communication mode;
  if the second identifier is the first-type identifier, the deactivation information further indicates switching a terminal device receiving the deactivation information from a point to multi-point communication mode to a point to point communication mode;
  if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;

the processor 502 further executes the following operations:
after sending the deactivation information to the N terminal devices according to the second identifier, determining PUCCH resource information of second reception confirmation information according to the PUCCH resource information corresponding to the PDSCH;
determining timing information of the second reception confirmation information according to the timing information of the activation information;
receiving the second reception confirmation information from the terminal devices according to the PUCCH resource information and the timing information of the second reception confirmation information, where the second reception confirmation information is used to indicate whether the deactivation information is received successfully.

In one embodiment, the first identifier is the first-type identifier, and the activation information includes PUCCH resource indication information and timing information;

the processor 502 further executes the following operations:
after sending the deactivation information to the N terminal devices according to the second identifier, determining PUCCH resource information of second reception confirmation information according to the PUCCH resource indication information of the activation information;
determining timing information of the second reception confirmation information according to the timing information of the activation information;
receiving the second reception confirmation information sent from the terminal devices according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

It should be noted here that the above apparatus provided by the present application can implement all the method steps implemented by the network device in the above method embodiments, and can achieve the same technical effects. The part of this embodiment which is same as the method embodiments and the beneficial effects will not be described in detail here.

Figure 6:
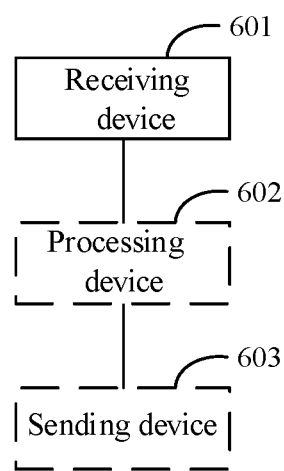
FIG. 6 is a schematic structural diagram of a semi-persistent scheduling apparatus for a multicast/broadcast service provided by another embodiment of the present application.

On the terminal side, an embodiment of the present application further provides a semi-persistent scheduling apparatus for a multicast/broadcast service. As shown in FIG. 6, the semi-persistent scheduling apparatus for a multicast/broadcast service in this embodiment may be a terminal device, and the semi-persistent scheduling apparatus for a multicast/broadcast service includes a receiving device 601. In one embodiment, the semi-persistent scheduling apparatus for a multicast/broadcast service further includes a processing device 602. In one embodiment, the semi-persistent scheduling apparatus for a multicast/broadcast service further includes a sending device 603.

The receiving device 601 is configured to: receive semi-persistent configuration information for a multicast/broadcast service from a network device, where the semi-persistent configuration information includes a first identifier and related information of a PDSCH for multicast/broadcast service transmission; receive activation information from the network device according to the first identifier, where the activation information is used to indicate activating the semi-persistent configuration information, and the first identifier is a first-type identifier or a second-type identifier, where the first-type identifier is used to identify a terminal device, and the second-type identifier is used to identify a terminal device group of a multicast/broadcast service which a terminal device belongs to; receive the PDSCH from the network device according to the activation information and the semi-persistent configuration information, where the PDSCH carries multicast/broadcast service data.

In one embodiment, a scrambling sequence of the PDSCH is obtained according to the second-type identifier, or,
the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the processing device 602 is configured to activate the semi-persistent configuration information according to the activation information before the receiving device receives the PDSCH from the network device.

In one embodiment, the sending device 603 is configured to send first reception confirmation information to the network device after the receiving device 601 receives the PDSCH from the network device according to the activation information and the semi-persistent configuration information, where the first reception confirmation information is used to indicate whether the PDSCH is received successfully.

In one embodiment, the first identifier is the first-type identifier, and the activation information includes PUCCH resource indication information and timing information;
the sending device 603 is configured to:
determine PUCCH resource information of the first reception confirmation information according to the PUCCH resource indication information of the activation information;
determine timing information of the first reception confirmation information according to the timing information of the activation information;
send the first reception confirmation information to the network device according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;

the receiving device 601 is further configured to receive the deactivation information from the network device according to the second identifier, where the deactivation information is used to indicate deactivating the semi-persistent configuration information;

where the second identifier is the first-type identifier or the second-type identifier.

In one embodiment, the processing device 602 is configured to deactivate the semi-persistent configuration information according to the deactivation information; and/or, determine, according to the deactivation information, that a multicast/broadcast communication mode of the terminal device is switched from a point to multi-point communication mode to a point to point communication mode.

In one embodiment, if the second identifier is the first-type identifier, the deactivation information further indicates switching a terminal device receiving the deactivation information from a point to multi-point communication mode to a point to point communication mode;

if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, if the second identifier is the second-type identifier, the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;

the sending device 603 is further configured to: after the receiving device receives the deactivation information from the network device according to the second identifier, determine PUCCH resource information of second reception confirmation information according to the PUCCH resource information corresponding to the PDSCH; determine timing information of the second reception confirmation information according to the timing information of the activation information; send the second reception confirmation information to the network device according to the PUCCH resource information and the timing information of the second reception confirmation information, where the second reception confirmation information is used to indicate whether the deactivation information is received successfully.

In one embodiment, the first identifier is obtained by scrambling the first-type identifier, and the activation information includes PUCCH resource indication information and timing information;

the sending device 603 is further configured to: after the receiving device receives the deactivation information from the network device according to the second identifier, determine PUCCH resource information of second reception confirmation information according to the PUCCH resource indication information of the activation information; determine timing information of the second reception confirmation information according to the timing information of the activation information; send the second reception confirmation information to the network device according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

It should be noted here that the above apparatus provided by the present application can implement all the method steps implemented by the terminal device in the above method embodiments, and can achieve the same technical effects. The part of this embodiment which is same as the method embodiments and the beneficial effects will not be described in detail here.

Figure 7:
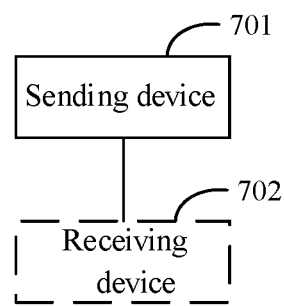
FIG. 7 is a schematic structural diagram of a semi-persistent scheduling apparatus for a multicast/broadcast service provided by another embodiment of the present application.

On the network side, an embodiment of the present application further provides a semi-persistent scheduling apparatus for a multicast/broadcast service. As shown in FIG. 7, the semi-persistent scheduling apparatus for a multicast/broadcast service in this embodiment may be a network device, and the semi-persistent scheduling apparatus for a multicast/broadcast service includes a sending device 701. In one embodiment, the semi-persistent scheduling apparatus for a multicast/broadcast service further includes a receiving device 702.

The sending device 701 is configured to: send semi-persistent configuration information for a multicast/broadcast service to N terminal devices, where the N terminal devices belong to a same terminal device group for the multicast/broadcast service, and N is an integer greater than or equal to 1, and where semi-persistent configuration information of each terminal device includes a first identifier and related information of a PDSCH for multicast/broadcast service transmission; send activation information to the N terminal devices according to the first identifier, where the first identifier is a first-type identifier or a second-type identifier, the first-type identifier is used to identify a terminal device, and the second-type identifier is used to identify a terminal device group of a multicast/broadcast service which a terminal device belongs to, and where the activation information is used to indicate activating the semi-persistent configuration information; send the PDSCH to the N terminal devices by multicast/broadcast according to the semi-persistent configuration information, where the PDSCH carries multicast/broadcast service data.

In one embodiment, a scrambling sequence of the PDSCH is obtained according to the second-type identifier, or, the semi-persistent configuration information further includes a third-type identifier, where the third-type identifier is used to generate a scrambling sequence of the PDSCH, and the scrambling sequence of the PDSCH is obtained according to the third-type identifier.

In one embodiment, the receiving device 702 is further configured to receive first reception confirmation information from the N terminal devices respectively after the sending device 701 sends the PDSCH to the N terminal devices by multicast/broadcast according to the semi-persistent configuration information, where the first reception confirmation information is used to indicate whether the PDSCH is received successfully.

In one embodiment, the first identifier is the first-type identifier, and the activation information includes PUCCH resource indication information and timing information;

the receiving device 702 is configured to:

determine PUCCH resource information of the first reception confirmation information according to the PUCCH resource indication information of the activation information;

determine timing information of the first reception confirmation information according to the timing information of the activation information;

receive the first reception confirmation information from the terminal devices according to the PUCCH resource information and the timing information of the first reception confirmation information.

In one embodiment, the first identifier is the second-type identifier, and the activation information is further used to indicate that downlink control information obtained by scrambling using the second-type identifier is not required to be detected within a preset time period.

In one embodiment, the semi-persistent configuration information includes a second identifier, and the second identifier is used to scramble deactivation information;

the sending device 701 is further configured to send the deactivation information to the N terminal devices according to the second identifier, where the deactivation information is used to indicate deactivating the semi-persistent configuration information;

where the second identifier is the first-type identifier or the second-type identifier.

In one embodiment, the deactivation information is further used to indicate switching a multicast/broadcast communication mode of a terminal device from a point to multi-point communication mode to a point to point communication mode.

In one embodiment, if the deactivation information is obtained by scrambling according to the second-type identifier, the deactivation information further indicates switching terminal devices belonging to the terminal device group from a point to multi-point communication mode to a point to point communication mode;

if the second identifier is the first-type identifier, the deactivation information further indicates switching a terminal device receiving the deactivation information from a point to multi-point communication mode to a point to point communication mode;

if the second identifier is the second-type identifier, the deactivation information further indicates switching terminal devices belonging to the terminal device group from a point to multi-point communication mode to a point to point communication mode.

In one embodiment, the deactivation information is downlink control information in a preset format.

In one embodiment, the second identifier is the second-type identifier, and the deactivation information is further used to indicate that second reception confirmation information is not required to be fed back, where the second reception confirmation information is used to indicate whether the deactivation information is received successfully.

In one embodiment, the related information of the PDSCH includes PUCCH resource information corresponding to the PDSCH, the first identifier is the first-type identifier, and the activation information includes timing information;

the receiving device 702 is configured to: after the sending device 701 sends the deactivation information to the N terminal devices according to the second-type identifier, determine PUCCH resource information of the second reception confirmation information according to the PUCCH resource information corresponding to the PDSCH; determine timing information of the second reception confirmation information according to the timing information of the activation information; receive the second reception confirmation information from the terminal devices according to the PUCCH resource information and the timing information of the second reception confirmation information, where the second reception confirmation information is used to indicate whether the deactivation information is received successfully.

In one embodiment, the first identifier is the first-type identifier, and the activation information includes PUCCH resource indication information and timing information;

the receiving device 702 is configured to: after the sending device 701 sends the deactivation information to the N terminal devices according to the second identifier, determine PUCCH resource information of second reception confirmation information according to the PUCCH resource indication information of the activation information; determine timing information of the second reception confirmation information according to the timing information of the activation information; receive the second reception confirmation information sent from the terminal devices according to the PUCCH resource information and the timing information of the second reception confirmation information, where the second reception confirmation information is used to indicate whether the deactivation information is received successfully.

In one embodiment, a reception end time of the PDSCH is used as a reception end time of the deactivation information to determine the PUCCH resource information of the second reception confirmation information.

In one embodiment, the first identifier is used to scramble the activation information.

In one embodiment, the second identifier is used to scramble the deactivation information.

It should be noted here that the above apparatus provided by the present application can implement all the method steps implemented by the network device in the above method embodiments, and can achieve the same technical effects. The part of this embodiment which is same as the method embodiments and the beneficial effects will not be described in detail here.

It should be noted that a division of devices in the embodiments of the present application is schematic and is only a logical function division, and there may be other division manners in actual implementation. In addition, the functional devices in the embodiments of the present application may be integrated in one processing device, or each device may exist physically alone, or two or more devices may be integrated in one device. The above-mentioned integrated device may be implemented in a form of hardware or a software functional device.

If implemented in the form of the software functional device and sold or used as an independent product, the integrated device may be stored in a processor-readable storage medium. Based on this understanding, a technical solution of the present application essentially or a part thereof that contributes to the prior art or all or part of the technical solution can be embodied in a form of a software product. The computer software product is stored in a storage medium and includes several instructions for making a computer device (which may be a personal computer, a server, or a network device, etc.) or a processor execute all or part of steps of the methods described in the embodiments of the present application. The aforementioned storage medium includes: a U disk, a mobile hard disk, a read-only memory (ROM), a random access memory (RAM), a magnetic disk, an optical disk or other media that can store program codes.

On the terminal side, an embodiment of the present application provides a processor-readable storage medium. The processor-readable storage medium stores a computer program, and the computer program is used to cause a processor to execute any of the methods related to the terminal device provided by the embodiments of the present application. The processor can implement all the method steps implemented by the terminal device in the above method embodiments, and can achieve the same technical effects. The part of this embodiment which is same as the method embodiments and the beneficial effects will not be described in detail here.

On the network side, an embodiment of the present application provides a processor-readable storage medium. The processor-readable storage medium stores a computer program, and the computer program is used to cause a processor to execute any of the methods related to the network device provided by the embodiments of the present application. The processor can implement all the method steps implemented by the network device in the above method embodiments, and can achieve the same technical effects. The part of this embodiment which is same as the method embodiments and the beneficial effects will not be described in detail here.

The processor-readable storage medium may be any available medium or data storage device that the processor can access, including but not limited to, a magnetic memory (such as a floppy disk, a hard disk, a magnetic tape, a magneto-optical disk (MO)), an optical memory (such as a CD, a DVD, a BD, a HVD, etc.), and a semiconductor memory (such as a ROM, an EPROM, an EEPROM, a non-volatile memory (NAND FLASH), a solid state disk (SSD)), etc.

The embodiments of the present application can be provided as methods, systems or computer program products. Therefore, the present application may take forms of entirely hardware embodiments, entirely software embodiments, or embodiments combining software and hardware aspects. Furthermore, the present application may take a form of a computer program product implemented on one or more computer-usable storage medium (including but not limited to a disk storage, an optical storage, etc.) in which computer-usable program codes are included.

The present application is described with reference to flowcharts and/or block diagrams of methods, apparatuses and computer program products according to the embodiments of the present application. It should be understood that each flow and/or block in the flowcharts and/or block diagrams, and a combination of flow and/or block in the flowcharts and/or block diagrams may be implemented by computer-executable instructions. These computer-executable instructions may be provided to a processor of a general-purpose computer, a special-purpose computer, an embedded processor or other programmable data processing devices to produce a machine, and an apparatus for implementing functions specified in one or more flows of the flowcharts and/or one or more blocks of the block diagrams is produced by instructions executed by the processor of the computer or other programmable data processing devices.

These processor-executable instructions may also be stored in a processor-readable memory that can guide a computer or other programmable data processing devices to work in a specific way, and the instructions stored in the processor-readable memory produce a manufactured product including an instruction apparatus, and the instruction apparatus implements functions specified in one or more flows of the flowcharts and/or one or more blocks of the block diagrams.

These processor-executable instructions may also be loaded on a computer or other programmable data processing devices, and a series of operation steps are executed on the computer or other programmable devices to produce computer-implemented processing, and the instructions executed on the computer or other programmable devices provide steps for implementing functions specified in one or more flows of the flowcharts and/or one or more blocks of the block diagrams.

The invention claimed is:

1. A semi-persistent scheduling method for a multicast/broadcast service, comprising:
receiving, by a terminal device, semi-persistent configuration information for a multicast/broadcast service from a network device, wherein the semi-persistent configuration information comprises a first identifier and related information of a physical downlink shared channel (PDSCH) for multicast/broadcast service transmission;
receiving, by the terminal device, activation information from the network device according to the first identifier, wherein the activation information is used to indicate activating the semi-persistent configuration information, and the first identifier is a first-type identifier or a second-type identifier, wherein the first-type identifier is used to identify a terminal device, and the second-type identifier is used to identify a terminal device group of a multicast/broadcast service which a terminal device belongs to; and
receiving, by the terminal device, the PDSCH from the network device according to the activation information and the semi-persistent configuration information, wherein the PDSCH carries multicast/broadcast service data.

2. The method according to claim 1, wherein the first-type identifier is a configured scheduling radio network temporary identifier (CS-RNTI).

3. The method according to claim 1, wherein the second-type identifier is a group configured scheduling radio network temporary identifier (GCS-RNTI).

4. The method according to claim 1, wherein a scrambling sequence of the PDSCH is obtained according to the second-type identifier, or,
the semi-persistent configuration information further comprises a third-type identifier, wherein the third-type identifier is used to generate a scrambling sequence of a PDSCH, and the scrambling sequence of the PDSCH is obtained according to the third-type identifier, wherein the third-type identifier is a group radio network temporary identifier (G-RNTI) or a GCS-RNTI.

5. The method according to claim 1, wherein before receiving, by the terminal device, the PDSCH from the network device, the method further comprises:

activating, by the terminal device, the semi-persistent configuration information according to the activation information.

6. The method according to claim 5, wherein receiving, by the terminal device, the activation information from the network device comprises:
receiving, by the terminal device, the activation information which is sent by the network device to the terminal device multiple times according to the second-type identifier.

7. The method according to claim 1, wherein after receiving, by the terminal device, the PDSCH from the network device according to the activation information and the semi-persistent configuration information, the method further comprises:
sending, by the terminal device, first reception confirmation information to the network device, wherein the first reception confirmation information is used to indicate whether the PDSCH is received successfully.

8. The method according to claim 7, wherein the first identifier is the first-type identifier, and the activation information comprises physical uplink control channel (PUCCH) resource indication information and timing information;
sending, by the terminal device, the first reception confirmation information to the network device comprises:
determining, by the terminal device, PUCCH resource information of the first reception confirmation information according to the PUCCH resource indication information of the activation information;
determining, by the terminal device, timing information of the first reception confirmation information according to the timing information of the activation information;
sending, by the terminal device, the first reception confirmation information to the network device according to the PUCCH resource information and the timing information of the first reception confirmation information.

9. The method according to claim 7, wherein after sending, by the terminal device, the first reception confirmation information to the network device, the method further comprises:
receiving, by the terminal device, scheduling information for PDSCH retransmission from the network device, wherein the scheduling information is scrambled by a CS-RNTI or a GCS-RNTI.

10. The method according to claim 1, wherein the first identifier is the second-type identifier, and the activation information is further used to indicate that downlink control information obtained by scrambling using the second-type identifier is not required to be detected within a preset time period.

11. The method according to claim 1, wherein the semi-persistent configuration information comprises a second identifier, and the method further comprises:
receiving, by the terminal device, deactivation information from the network device according to the second identifier, wherein the deactivation information is used to indicate deactivating the semi-persistent configuration information;
wherein the second identifier is the first-type identifier or the second-type identifier.

12. The method according to claim 11, wherein the method further comprises:
deactivating, by the terminal device, the semi-persistent configuration information according to the deactivation information; and/or,
determining, by the terminal device according to the deactivation information, that a multicast/broadcast communication mode of the terminal device is switched from a point to multi-point communication mode to a point to point communication mode.

13. The method according to claim 12, wherein,
upon determining that the second identifier is the first-type identifier, the deactivation information further indicates switching a terminal device receiving the deactivation information from a point to multi-point communication mode to a point to point communication mode;
upon determining that the second identifier is the second-type identifier, the deactivation information further indicates switching terminal devices belonging to the terminal device group from a point to multi-point communication mode to a point to point communication mode.

14. The method according to claim 11, wherein upon determining that the second identifier is the second-type identifier, the deactivation information is further used to indicate that second reception confirmation information is not required to be fed back, wherein the second reception confirmation information is used to indicate whether the deactivation information is received successfully.

15. The method according to claim 11, wherein the related information of the PDSCH comprises PUCCH resource information corresponding to the PDSCH, the first identifier is the first-type identifier, and the deactivation information comprises timing information;
after receiving, by the terminal device, the deactivation information from the network device according to the second identifier, the method further comprises:
determining, by the terminal device, PUCCH resource information of second reception confirmation information according to the PUCCH resource information corresponding to the PDSCH;
determining, by the terminal device, timing information of the second reception confirmation information according to the timing information of the deactivation information;
sending, by the terminal device, the second reception confirmation information to the network device according to the PUCCH resource information and the timing information of the second reception confirmation information, wherein the second reception confirmation information is used to indicate whether the deactivation information is received successfully.

16. The method according to claim 15, wherein a reception end time of the PDSCH is used as a reception end time of the deactivation information to determine the PUCCH resource information of the second reception confirmation information.

17. The method according to claim 11, wherein the first identifier is obtained by scrambling the first-type identifier, and the deactivation information comprises PUCCH resource indication information and timing information;
after receiving, by the terminal device, the deactivation information from the network device according to the second identifier, the method further comprises:
determining, by the terminal device, PUCCH resource information of second reception confirmation information according to the PUCCH resource indication information of the deactivation information;

determining, by the terminal device, timing information of the second reception confirmation information according to the timing information of the deactivation information;

sending, by the terminal device, the second reception confirmation information to the network device according to the PUCCH resource information and the timing information of the second reception confirmation information, wherein the second reception confirmation information is used to indicate whether the deactivation information is received successfully.

18. A semi-persistent scheduling method for a multicast/broadcast service, comprising:

sending, by a network device, semi-persistent configuration information for a multicast/broadcast service to N terminal devices, wherein the N terminal devices belong to a same terminal device group for the multicast/broadcast service, N is a quantity of terminal devices belonging to the same terminal device group, and N is an integer greater than or equal to 1, and wherein semi-persistent configuration information of each terminal device comprises a first identifier and related information of a physical downlink shared channel (PDSCH) for multicast/broadcast service transmission;

sending, by the network device, activation information to the N terminal devices according to the first identifier, wherein the first identifier is a first-type identifier or a second-type identifier, the first-type identifier is used to identify a terminal device, and the second-type identifier is used to identify a terminal device group of a multicast/broadcast service which a terminal device belongs to, and wherein the activation information is used to indicate activating the semi-persistent configuration information; and sending, by the network device, the PDSCH to the N terminal devices by multicast/broadcast according to the semi-persistent configuration information, wherein the PDSCH carries multicast/broadcast service data.

19. A semi-persistent scheduling apparatus for a multicast/broadcast service, applied to a network device, and the apparatus comprises a memory, a transceiver and a processor;

the memory is configured to store a computer program;

the transceiver is configured to transceive data under control of the processor;

the processor is configured to read the computer program in the memory and execute the method according to claim 18.

20. A semi-persistent scheduling apparatus for a multicast/broadcast service, applied to a terminal device, and the apparatus comprises a memory, a transceiver and a processor;

the memory is configured to store a computer program;

the transceiver is configured to transceive data under control of the processor;

the processor is configured to read the computer program in the memory and execute the method according to claim 1.

* * * * *